(12) United States Patent
Li et al.

(10) Patent No.: US 12,110,441 B2
(45) Date of Patent: Oct. 8, 2024

(54) SURFACTANT

(71) Applicant: SPHERE FLUIDICS LIMITED, Babraham (GB)

(72) Inventors: Xin Li, Babraham (GB); Clive A. Smith, Babraham (GB); Alexandra Clay, Haverhill (GB); Colin Pilkington, London (GB)

(73) Assignee: SPHERE FLUIDICS LIMITED, Cambridge (GB)

( * ) Notice: Subject to any disclaimer, the term of this patent is extended or adjusted under 35 U.S.C. 154(b) by 137 days.

(21) Appl. No.: 16/768,121

(22) PCT Filed: Nov. 29, 2018

(86) PCT No.: PCT/GB2018/053452
§ 371 (c)(1),
(2) Date: May 29, 2020

(87) PCT Pub. No.: WO2019/106366
PCT Pub. Date: Jun. 6, 2019

(65) Prior Publication Data
US 2020/0316545 A1 Oct. 8, 2020

(30) Foreign Application Priority Data
Nov. 29, 2017 (GB) .................................... 1719846

(51) Int. Cl.
| | |
|---|---|
| *C09K 23/18* | (2022.01) |
| *B01D 11/04* | (2006.01) |
| *B01D 17/04* | (2006.01) |
| *B01D 17/12* | (2006.01) |
| *B01L 3/00* | (2006.01) |
| *C08G 65/00* | (2006.01) |
| *C09K 23/00* | (2022.01) |
| *C09K 23/16* | (2022.01) |

(52) U.S. Cl.
CPC .......... *C09K 23/18* (2022.01); *B01D 11/0492* (2013.01); *B01D 11/0496* (2013.01); *B01D 17/045* (2013.01); *B01D 17/12* (2013.01); *B01L 3/5021* (2013.01); *C08G 65/007* (2013.01); *C09K 23/007* (2022.01); *C09K 23/16* (2022.01)

(58) Field of Classification Search
CPC ...... C09K 23/00; C09K 23/16; C09K 23/007; C09K 23/32; C09K 23/42–48; C11D 1/38; C11D 1/40; C11D 1/52–528; C11D 1/58; C11D 1/62; C08G 65/007
See application file for complete search history.

(56) References Cited

U.S. PATENT DOCUMENTS

| | | | |
|---|---|---|---|
| 3,555,089 A * | 1/1971 | Bartlett | C07C 291/04 252/60 |
| 9,513,207 B2 | 12/2016 | Smith et al. | |
| 2005/0048288 A1 | 3/2005 | Flynn et al. | |
| 2011/0124782 A1 | 5/2011 | Dams et al. | |
| 2012/0122714 A1 | 5/2012 | Samuels et al. | |
| 2015/0217246 A1 | 8/2015 | Holtze | |

FOREIGN PATENT DOCUMENTS

| | | | |
|---|---|---|---|
| CN | 106823986 A | 6/2013 | |
| EP | 818490 A2 * | 1/1998 | ............. C08F 14/18 |
| JP | 2016047812 A * | 4/2016 | |
| WO | 20050047962 A2 | 5/2005 | |
| WO | 2005073787 A2 | 8/2005 | |
| WO | WO-2005123646 A2 * | 12/2005 | ........... C07C 235/10 |
| WO | 20170203280 | 11/2017 | |

OTHER PUBLICATIONS

Machine Translation of JP2016-047812A. Apr. 7, 2016. (Year: 2016).*
Bernett, M. Oligomeric Fluorinated Additives as Surface Modifiers for Solid Polymers. Polymer Engineering and Science, 1977, 17(7), 450-455. (Year: 1977).*
Begum, F. Surfactants. Kirk-Othmer Encyclopedia of Chemical Technology. John Wiley & Sons, Inc. 2020. (Year: 2020).*
Miyazawa et al. A Critical Review of the Use of Surfactant-Coated Nanoparticles in Nanomedicine and Food Nanotechnology. International Journal of Nanomedicine, 2021, 16, 3937-3999. (Year: 2021).*
Zhao et al.; "Encapsulation of lipase in mesoporous silica yolk-shell spheres with enhanced enzyme stability"; 22008-22013; RSC Advances; 3; 2013; Aug. 21, 2013.
Chiu et al; ACS Nano; 8; 2014; "Synthesis of Flurorosurfactants for emulsion-based biological applications"; Apr. 22, 2018.
Holt, et al: Journal of Fluorine Chemistry; Synthesis of novel fluorous surfactants for microdroplet stabilisation in flurous oil streams; Journal of Fluorine Chemistry, 2010, 131, 398-407.
Liu, et al; A facile soft-template synthesis of mesoporous polymeric and carbonaceous nanospheres; Published Dec. 17, 2013; 7 pgs, Nature Communications, 2013, 4, 3798/1-3798/7.
Intellectual Property Office; GB Search Report; www.gov.uk/ipo; 5 pages, Aug. 22, 2018.
European Office Action for Application EP 18815297.9-1109 Ref. PC928426EP dated Jul. 19, 2023.

* cited by examiner

*Primary Examiner* — Stephen E Rieth
(74) *Attorney, Agent, or Firm* — Renner, Kenner, Greive, Bobak, Taylor & Weber

(57) ABSTRACT

A surfactant of formula (I):

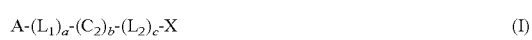

wherein
A is a perfluoropolyether;
$L_1$ is CONR', wherein R' is selected from H and $C_{1-6}$ alkyl;
a is 0 or 1;

(Continued)

b is 0 or an integer between 1 and 10;
$L_2$ is a linking group;
c is 0 or 1; and
X is a charged group.

13 Claims, 3 Drawing Sheets

SURFACTANT

INTRODUCTION

The present invention relates to surfactants that are particularly useful for the stabilisation of water in oil emulsions. Specifically, the surfactants have been found to form water in oil emulsions wherein even hydrophobic small molecules are retained in aqueous droplets for useful periods of time. The present invention also relates to compositions and emulsions comprising the surfactants as well as to methods for making surfactants and emulsions comprising the surfactant. Additionally, the present invention relates to various methods, wherein the surfactant and/or emulsions are employed, e.g. in droplet sorting, coalescing droplets, splitting droplets etc.

BACKGROUND

Surfactants have been used for many years in the production of stable emulsions for various applications. General background prior art relating to emulsions can be found in the following: U.S. Pat. Nos. 5,587,153; 6,017,546; WO2005/099661; US2004/081633; U.S. Pat. No. 6,379,682; US2002/172703; WO2004/038363; US2005/087122; US2007/275415 and US2008/053205. Conventional surfactants generally comprise a hydrophilic head group soluble in an aqueous phase of an emulsion and one or more lipophilic tails soluble in an oil phase of an emulsion.

More recently, surfactant-stabilised emulsions comprising microdroplets of water in a continuous oil phase have found applications in microfluidic technologies, enabling, for example, high throughput screening, enzyme studies, nucleic acid amplification and other biological processes to be conducted. Biological assays may, for example, be performed in microfluidic devices using a very small quantity of biological material. Further information relating to microfluidic technology can be found in our previous applications WO2009/050512 and WO2015/015199. Other general background prior art on microdroplets can be found in patents/applications in the name of RainDance Technologies Inc., for example WO2008/063227.

In microfluidic applications the use of oils and especially fluoruous oils as the continuous phase in emulsion formation and production is beneficial because they have useful microfluidic properties, such as low friction, non-volatility (unlike alcohols), temperature-resistance and can easily create oil-water emulsions.

However, conventional surfactants are generally not suitable for stabilising emulsions comprising a fluorous oil phase due to solubilty issues. Furthermore, many conventional surfactants are toxic to biological molecules and to cells and can hinder gas transfer from the external environment to the inner regions of the emulsion.

Moreover, it has been found that small organic molecules, and especially hydrophobic small organic molecules, have a tendency to leak out, or escape from, aqueous droplets into the fluorous oil phase. This is because these types of molecules prefer to locate into the fluorous oil phase and the barrier, i.e. the droplet membrane formed by conventional surfactants is not sufficient to prevent the molecules moving through it or across it. This is obviously problematic in microfluidic technologies which rely on the aqueous droplets formed by the surfactants to retain analytes in the aqueous phase whilst sorting, assessing etc. is carried out.

New surfactants suitable for stabilising water in oil (e.g. fluorous oil) emulsions, and in particular such emulsions comprising hydrophobic small organic molecules in the aqueous phase, are therefore required.

SUMMARY OF INVENTION

Viewed from a first aspect the present invention provides a surfactant of formula (I):

wherein
A is a perfluoropolyether;
$L_1$ is CONR', wherein R' is selected from H and $C_{1-6}$ alkyl;
a is 0 or 1;
b is 0 or an integer between 1 and 10;
$L_2$ is a linking group;
c is 0 or 1; and
X is a charged group.

Viewed from a further aspect the present invention provides a method for making a surfactant of formula (I),

wherein
A is a perfluoropolyether;
$L_1$ is CONR', wherein R' is selected from H and $C_{1-6}$ alkyl;
a is 0 or 1;
b is 0 or an integer between 1 and 6;
$L_2$ is a linking group;
c is 0 or 1; and
X is

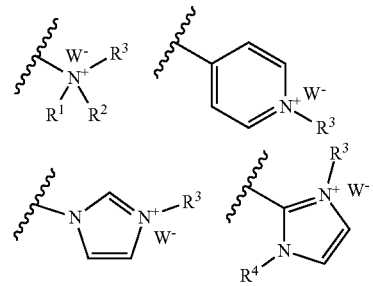

wherein
$R^1$ and $R^2$ are independently selected from H and $C_{1-6}$ alkyl, preferably methyl;
$R^3$ is selected from $C_{1-6}$ alkyl and $(CH_2)_dO(CH_2CH_2O)_eR^x$, wherein $R^x$ is H or $C_{1-6}$ alkyl, d is a positive integer from 2 to 6, and e is 0 or a positive integer from 1 to 100, preferably 5 to 50 and more preferably 10 to 30;
$R^4$ is selected from $C_{1-6}$ alkyl; and
$W^-$ is a counter ion;
comprising reacting a compound of formula (a): A-$(L_1)_a$-$(CH_2)_b$-$(L_2)_c$-X' (a)
wherein
A is a perfluoropolyether;
$L_1$ is CONR', wherein R' is selected from H and $C_{1-6}$ alkyl;
a is 0 or 1;
b is 0 or an integer between 1 and 6;
$L_2$ is a linking group;
c is 0 or 1; and X' is:

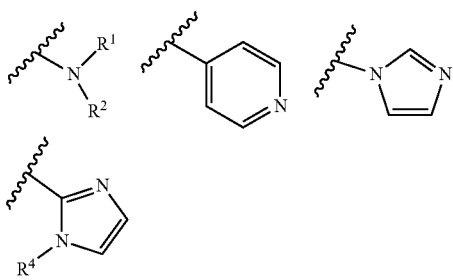

wherein
  $R^1$ and $R^2$ are independently selected from H and $C_{1-6}$ alkyl, preferably methyl; and
  $R^4$ is selected from $C_{1-6}$ alkyl;
with $R^3$—W, wherein
  $R^3$ is selected from $C_{1-6}$ alkyl, and $(CH_2)_dO(CH_2CH_2O)_eR^x$, wherein $R^x$ is H or $C_{1-6}$ alkyl, d is a positive integer from 2 to 6, and e is 0 or a positive integer from 1 to 100, preferably 5 to 50 and more preferably 10 to 30; or
with W—$(CH_2)_rO(CH_2CH_2O)_g(CH_2)_s$—W, wherein r is a positive integer from 2 to 6, g is 0 or a positive integer (e.g. 1 to 100), s is 0 or a positive integer from 2 to 6; and W is a leaving group Viewed from a further aspect the present invention provides a method for making a surfactant of formula (I), $$A\text{-}(L_1)_a\text{-}(CH_2)_b\text{-}(L_2)_c\text{-}X \qquad (I)$$

wherein
  A is a perfluoropolyether;
  $L_1$ is CONR', wherein R' is selected from H and $C_{1-6}$ alkyl;
  a is 0 or 1;
  b is 0 or an integer between 1 and 6;
  $L_2$ is a linking group;
  c is 0 or 1; and
  X is

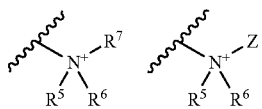

wherein
  $R^5$ is selected from H and $C_{1-6}$ alkyl;
  $R^6$ is an $C_{1-6}$ alkyl group substituted by a $COO^-$ or $SO_3^-$ group;
  $R^7$ is selected from H, $C_{1-6}$ alkyl and $(CH_2)_dO(CH_2CH_2O)_eR^x$, wherein $R^x$ is independently H or $C_{1-6}$ alkyl, d is a positive integer from 2 to 6, and e is 0 or a positive integer from 1 to 100, preferably 5 to 50 and more preferably 10 to 30; and
  Z is —$(CH_2)_rO(CH_2CH_2O)_g(CH_2)_s$—X-$(L_2)_c$-$(CH_2)_b$-$(L_1)_a$-A, wherein r is a positive integer from 2 to 6, g is 0 or a positive integer, s is 0 or a positive integer from 2 to 6, X is as herein defined in relation to formula IIIbi and $L_2$, $L_1$, A, c, b and a are as herein defined in relation to formula (I);

comprising reacting a compound of formula (a): A-$(L_1)_a$-$(CH_2)_b$-$(L_2)_c$-X' (a) wherein
  A is a perfluoropolyether;
  $L_1$ is CONR', wherein R' is selected from H and $C_{1-6}$ alkyl;
  a is 0 or 1;
  b is 0 or an integer between 1 and 6;
  $L_2$ is a linking group;
  c is 0 or 1; and
  X' is:

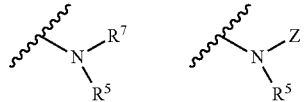

wherein
  $R^5$ is selected from H and $C_{1-6}$ alkyl; and
  $R^7$ is selected from H, $C_{1-6}$ alkyl, $(CH_2)_dO(CH_2CH_2O)_eR^x$, wherein $R^x$ is independently H or $C_{1-6}$ alkyl, d is a positive integer from 2 to 6, and e is 0 or a positive integer from 1 to 100, preferably 5 to 50 and more preferably 10 to 30;
  Z is —$(CH_2)_rO(CH_2CH_2O)_g(CH_2)_s$—X-$(L_2)_c$-$(CH_2)_b$-$(L_1)_a$-A, wherein r is a positive integer from 2 to 6, g is 0 or a positive integer, s is 0 or a positive integer from 2 to 6, X is as herein defined in relation to formula IIIbi, and $L_2$, $L_1$, A, c, b and a are as herein defined in relation to formula (I);
with $R^6$-W, wherein
  $R^6$ is selected from a $C_{1-6}$ alkyl group substituted by a COOH or $SO_3H$ group; and
  W is a leaving group.

Viewed from a further aspect the present invention provides a method for making a surfactant of formula (I):

$$A\text{-}(L_1)_a\text{-}(CH_2)_b\text{-}(L_2)_c\text{-}X \qquad (I)$$

wherein
  A is a perfluoropolyether;
  $L_1$ is CONR', wherein R' is selected from H and $C_{1-6}$ alkyl;
  a is 0 or 1;
  b is 0 or an integer between 1 and 6;
  $L_2$ is a linking group;
  c is 0 or 1; and
  X is

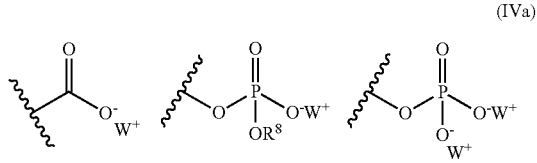
(IVa)

wherein
  $R^8$ is selected from H, $C_{1-6}$ alkyl and $(CH_2CH_2O)_eR^x$, wherein $R^x$ is independently H or $C_{1-6}$ alkyl and e is a positive integer from 1 to 100, preferably 5 to 50 and more preferably 10 to 30;
  Z is selected from —$(CH_2)_rO(CH_2CH_2O)_g(CH_2)_s$—X-$(L_2)_c$-$(CH_2)_b$-$(L_1)_a$-A and —$(CH_2)_tCH_u[(CH_2)_rO(CH_2CH_2O)_gR^x]_w[(CH_2)_r$—X-$(L_2)_c$-$(CH_2)_b$-$(L_1)_a$-A]$_y$, wherein r is a positive integer from 2 to 6, t is a positive integer from 1 to 6, u is 0 or 1, w and y is 1 or 2, the sum of u, w and y equals to 3, g is 0 or a positive integer, s is 0 or a positive integer from 2 to 6, $R^x$ is independently H or $C_{1-6}$ alkyl, X is as herein defined in relation to formula IVb, and $L_2$, $L_1$, A, c, b and a are as herein defined in relation to formula (I); and $W^+$ is a counter ion;
comprising reacting a compound of formula A-$(L_1)_a$-$(CH_2)_b$-$(L_2)_c$-OH with $POCl_3$, followed by hydrolysis, wherein A is a perfluoropolyether;

$L_1$ is CONR', wherein R' is selected from H and $C_{1-6}$ alkyl;

a is 0 or 1;

b is 0 or an integer between 1 and 6;

$L_2$ is a linking group; and c is 0 or 1;

and optionally reacting the resulting compound with $C_{1-6}$ alcohol or $HO(CH_2CH_2O)_eR^x$, $HO—(CH_2)_rO(CH_2CH_2O)_g(CH_2)_s$—OH or $HO—(CH_2)_tCH_u[(CH_2)_rO(CH_2CH_2O)_gR^x]_w$-$[(CH_2)_t—OH]_y$, wherein $R^x$ is independently H or $C_{1-6}$ alkyl, r is a positive integer from 2 to 6, t is a positive integer from 1 to 6, u is 0 or 1, w and y is 1 or 2, the sum of u, w and y equals to 3, s is 0 or a positive integer from 2 to 6 and e and g is a positive integer from 1 to 100, preferably 5 to 50 and more preferably 10 to 30.

Viewed from a further aspect the present invention provides a composition comprising a surfactant as hereinbefore defined.

Viewed from a further aspect the present invention provides the use of a compound of formula (I) as hereinbefore defined as a surfactant.

Viewed from a further aspect the present invention provides the use of a surfactant as hereinbefore described in the preparation of an emulsion.

Viewed from a further aspect the present invention provides an emulsion comprising a surfactant as hereinbefore described.

Viewed from a further aspect the present invention provides a method of preparing an emulsion as hereinbefore defined comprising:
  (i) providing an aqueous phase;
  (ii) providing an oil phase, preferably a fluorous oil phase; and
  (iii) mixing said aqueous phase, said oil phase and a surfactant as hereinbefore defined to form said emulsion.

Viewed from a further aspect the present invention provides a method comprising performing one or more chemical and/or biological reactions, and/or biological processes in the discontinuous aqueous phase of an emulsion as hereinbefore defined.

Viewed from a further aspect the present invention provides a method for sorting droplets in a microfluidic device, the method comprising:
  (i) providing a stream of aqueous droplets in an emulsion as hereinbefore defined in a channel of the microfluidic device;
  (ii) illuminating the stream from a first direction;
  (iii) detecting light from analytes within the droplets in a second direction; and
  (iv) sorting the droplets into one of a plurality of differentiated streams responsive to the detected light or a measurable signal.

Viewed from a further aspect the present invention provides a method of coalescing droplets in a microfluidic device, the method comprising:
  (i) providing at least two aqueous droplets in an emulsion as hereinbefore defined in a channel of the microfluidic device; and
  (ii) exposing the aqueous droplets to an electric field, thereby causing coalescence of the at least two aqueous droplets into a single droplet.

Viewed from a further aspect the present invention provides a method of introducing a fluid into a droplet in a microfluidic device, the method comprising:
  (i) providing an aqueous droplet in an emulsion as hereinbefore defined in a channel of the microfluidic device; and
  (ii) contacting the aqueous droplet with a stream of fluid, thereby introducing said fluid into the aqueous droplet.

Viewed from a further aspect the present invention provides a method of splitting droplets in a microfluidic device, the method comprising:
  (i) providing a microfluidic device comprising a microfluidic junction, said microfluidic junction comprising a first microfluidic channel, a second microfluidic channel and a third microfluidic channel;
  (ii) providing an aqueous droplet in an emulsion as hereinbefore defined in said first microfluidic channel; and
  (iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel.

Viewed from a further aspect the present invention provides a method of sorting droplets in a microfluidic device, the method comprising:
  (i) providing a microfluidic device comprising a microfluidic junction, said microfluidic junction comprising a first microfluidic channel, a second microfluidic channel and a third microfluidic channel;
  (ii) providing an aqueous droplet in an emulsion as hereinbefore defined in said first microfluidic channel;
    (iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel;
    (iv) detecting said first daughter droplet by mass spectroscopy; and
    (v) sorting said second daughter droplets into one of a plurality of differentiated streams responsive to the mass spectroscopy on said first daughter droplet.

Viewed from a further aspect the present invention provides a method of extracting a molecule from a fluid, the method comprising:
  (i) dissolving a surfactant as hereinbefore defined in carbon dioxide to form a carbon dioxide/surfactant mixture;
  (ii) adding a fluid comprising the molecule to the carbon dioxide/surfactant mixture, thereby extracting the molecule from the fluid into the carbon dioxide.

Viewed from a further aspect the present invention provides the use of a surfactant as hereinbefore defined in a microfluidic channel or device, in a molecular isolation in larger fluidic devices, containers or vats, or in an automated device with associated software that controls a microfluidic channel or device.

Viewed from a further aspect the present invention provides the use of an emulsion as hereinbefore defined in a microfluidic channel or device or in an automated device with associated software that controls a microfluidic channel or device Definitions As used herein the term "perfluoropolyether" refers to a polyether compound wherein all of the hydrogen atoms have been replaced by fluorine atoms.

As used herein the term "polyether" refers to an organic compound comprising two or more —O— linkages.

As used herein the term "charged group" refers to a group comprising at least one positively charged or negatively charged atom or group of atoms. The term encompasses groups wherein both a positive charge and a negative charge is present, i.e. zwitterionic groups.

As used herein, a wavy bond indicates the point of attachment of a group to another part of the compound of which it is a constituent part. Thus, a group with one wavy bond is a terminal group whereas a group with two wavy bonds is generally a linking group.

As used herein the term "alkyl" refers to saturated, straight chained, branched or cyclic groups. Alkyl groups may be substituted or unsubstituted.

As used herein the term "alkylene" refers to a bivalent alkyl group.

As used herein the term "substituted" refers to a group wherein one or more, for example up to 6, more especially 1, 2, 3, 4, 5 or 6, of the hydrogen atoms in the group are replaced independently of each other by the corresponding number of the described substituents. The term "optionally substituted" as used herein means substituted or unsubstituted.

As used herein the term "polyalkylene oxide" refers to a compound or group comprising repeating units derived from one or more alkylene oxides (e.g. ethylene oxide and/or propylene oxide). These compounds comprise -alkylene-O— repeat units. Typically, the alkylene is ethylene or propylene or a mixture thereof. The term "polyalkylene oxide" is used synonomously with "poly(alkylene oxide)", "poly(oxyalkylene) and "poly(alkylene glycol)".

As used herein the term "fluorous" refers to any group or substance which contains one or more fluorine atoms. Generally, the group or substance contains multiple fluorine atoms. For example, a fluorous oil refers to any oil containing fluorine atoms, including partially fluorinated hydrocarbons, perfluorocarbons, hydrofluoroethers and mixtures thereof.

As used herein the term "leaving group" refers to any atom or group capable of departing from a molecule following heterolytic cleavage of the covalent bond joining the leaving group to the rest of the molecule, taking with it the bonding electrons from the covalent bond.

DETAILED DESCRIPTION OF THE INVENTION

The present invention relates to surfactants which are particularly useful for the stabilisation of water in oil emulsions. The surfactants comprise a lipophilic, perfluoropolyether tail which extends out into or "faces" the oil phase and a hydrophilic head which "faces" the aqueous phase. In some surfactants of the present invention, the charged group forms the hydrophilic head. In particularly preferred surfactants of the invention, the surfactants comprise a perfluoropolyether tail, a hydrophilic head and a charged group in between the perfluoropolyether tail and the hydrophilic head. In these latter surfactants the charged group is believed to advantageously form a charged interface layer around the droplet which is believed to minimise, or prevent, the leakage of small organic molecules, and in particular, small organic hydrophobic molecules, from the aqueous phase in the droplets to the oil phase. Effectively it is thought that the charged group creates a charge barrier in the droplet membrane between the lipophilic tail and the hydrophilic head which makes it unfavourable for hydrophobic molecules to pass through or across the membrane.

The surfactants of the invention are of formula (I):

$$A\text{-}(L_1)_a\text{-}(CH_2)_b\text{-}(L_2)_c\text{-}X \qquad (I)$$

wherein
A is a perfluoropolyether;
$L_1$ is CONR', wherein R' is selected from H and $C_{1-6}$ alkyl;
a is 0 or 1, preferably 1;
b is 0 or an integer between 1 and 10, preferably 2-3;
$L_2$ is a linking group;
c is 0 or 1, preferably 0; and
X is a charged group.

In surfactants of the present invention, A preferably comprises a repeat unit of the formula —[CF(CF$_3$)CF$_2$O]$_m$—, wherein m is a positive integer. More preferably A comprises a unit of the formula —[CF$_2$CF$_2$O]$_n$[CF(CF$_3$)CF$_2$O]$_m$—, wherein m and n are each 0 or a positive integer, with the proviso that m and n are not both 0. n is preferably 0 or an integer from 1 to 100, e.g. an integer from 5 to 50. In preferred surfactants n is 0. In particularly preferred surfactants A consists of the formula CF$_3$CF$_2$CF$_2$O—[CF(CF$_3$)CF$_2$O]$_m$—CF(CF$_3$)—, wherein m is a positive integer. In the surfactants of the present invention in the above formulae m is preferably an integer from 1 to 100 (e.g. 1 to 50), more preferably an integer from 5 to 50 and particularly preferably an integer from 10 to 25. In preferred surfactants of the present invention A has a weight average molecular weight of 166 to 16,600 Da, more preferably 800 to 9,000 Da and yet more preferably 1,500 to 6,000 Da.

In some surfactants of the present invention, a is 0. More preferably, however, a is 1 and $L_1$ is CONH or CONC$_{1-6}$ alkyl and still more preferably a is 1 and $L_1$ is CONH or CONCH$_3$.

In further preferred surfactants of the present invention, b is a positive integer. Thus, in preferred surfactants of the invention there is an alkylene group between the perfluoropolyether component of the surfactant and the charged X group. The alkyl group acts as a spacer and advantageously makes the surfactant more stable, e.g. more resistant to hydrolysis. Preferably b is an integer from 1 to 10. More preferably b is 2 or 3.

In some surfactants of the present invention c is 1 and $L_2$ is a linking group comprising or consisting of an amide, thioester, ester, carbonate, carbamate, ether, thioether, urea, sulfonyl or sulphonamide. More preferably the linking group comprises, e.g. consists of, an amide or sulphonamide linkage. In some preferred surfactants of the present invention, c is 1 and $L_2$ is a linking group comprising or consisting of —C(O)NH—, —C(O)NMe-, —NHC(O)—, —NMeC(O)—, —NHCOCH=CH—, —NMeCOCH=CH—, —C(O)S—, —SC(O)—, —C(O)O—, —OC(O)—, —OC(O)O—, —OC(O)NH—, —OC(O)NMe, —O—, —S—, —NHC(O)NH—, —NMeC(O)NH—, —NHC(O)NMe-, —NHC(O)O—, —NMeC(O)O—, —SO$_2$NH—, —NHSO$_2$—, —SO$_2$NMe-, —NMeSO$_2$— —NHSO$_2$—C$_6$H$_4$—O— and —O—C$_6$H$_4$—SO$_2$NH—. More preferably the linking group comprises or consists of —C(O)NH—, —C(O)NMe-, —NHC(O)—, —NMeC(O)—, —NHCOCH=CH—, —NMeCOCH=CH—, —SO$_2$NH— and —NHSO$_2$— and more preferably —NHC(O)—, —NMeC(O)—, —NHCOCH=CH—, —NMeCOCH═CH—, —SO$_2$NH—, —NHSO$_2$—, —SO$_2$NMe- and —NMeSO$_2$—. More preferably, however, c is 0.

In particularly preferred surfactants of the invention, A is CF$_3$CF$_2$CF$_2$O—[CF(CF$_3$)CF$_2$O]$_m$-CF(CF$_3$)—, wherein m is a positive integer (e.g. 1 to 100), a is 1 and L$_1$ is CONH or CONC$_{1-6}$ alkyl, b is an integer from 1 to 10 and c is 0. In still further preferred surfactants A is CF$_3$CF$_2$CF$_2$O—[CF(CF$_3$)CF$_2$O]$_m$—CF(CF$_3$)—, wherein m is 5 to 50, a is 1 and L$_1$ is CONH or CONC$_{1-6}$ alkyl, b is 2 or 3 and c is 0.

In some preferred surfactants of the present invention, a and b are not both 0.

In some preferred surfactants of the present invention, a and c are not both 0.

In some preferred surfactants of the present invention, b and c are not both 0.

In some preferred surfactants of the present invention, a, b and c are not all 0.

In the surfactants of the present invention, X comprises a positively charged group, a zwitterionic group or a negatively charged group.

When X is a positively charged group, A is preferably CF$_3$CF$_2$CF$_2$O—[CF(CF$_3$)CF$_2$O]$_m$—CF(CF$_3$)—, wherein m is a positive integer (e.g. 1 to 100). When X is a positively charged group a is preferably 1 and L$_1$ is CONH or CONC$_{1-6}$ alkyl. When X is a postively charged group, b is preferably an integer from 1 to 10. When X is a positively charged group, c is preferably 0. Still more preferably when X is a positively charged group, A is CF$_3$CF$_2$CF$_2$O—[CF(CF$_3$)CF$_2$O]$_m$—CF(CF$_3$)—, wherein m is a positive integer (e.g. 1 to 100), a is 1 and L$_1$ is CONH or CONC$_{1-6}$ alkyl, b is an integer from 1 to 10 and c is 0.

In the surfactants of the present invention when X is a positively charged group, the positively charged group preferably comprises a quaternary nitrogen atom.

In the surfactants of the present invention, when X is a positively charged group, X is preferably selected from formula (IIa):

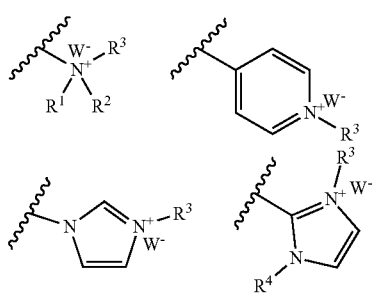

(IIa)

wherein
R$^1$ and R$^2$ are independently selected from H and C$_{1-6}$ alkyl, preferably methyl;
R$^3$ is selected from C$_{1-6}$ alkyl and (CH$_2$)$_d$O(CH$_2$CH$_2$O)$_e$R$^x$, wherein R$^x$ is H or C$_{1-6}$ alkyl, d is a positive integer from 2 to 6, and e is 0 or a positive integer from 1 to 100, preferably 5 to 50 and more preferably 10 to 30;
R$^4$ is selected from C$_{1-6}$ alkyl; and
W$^-$ is a counter ion.

The wavy line denotes where the X group is attached to the remainder of the surfactant, i.e. L$_2$ where L$_2$ is present, otherwise (CH$_2$)$_b$ where b is 1 or more, otherwise L$_1$.

Preferably R$^1$ and R$^2$ are independently selected from C$_{1-6}$ alkyl. More preferably R$^1$ and R$^2$ are selected from methyl, ethyl, propyl and butyl. Still more preferably R$^1$ and R$^2$ are methyl.

Preferably R$^3$ is selected from C$_{1-6}$ alkyl and (CH$_2$)$_d$O(CH$_2$CH$_2$O)$_e$R$^x$, wherein R$^x$ is H or C$_{1-6}$ alkyl, d is 2, and e is a positive integer from 1 to 100, preferably 5 to 50 and more preferably 10 to 30. Still more preferably R$^3$ is selected from C$_{1-6}$ alkyl and yet more preferably methyl.

Preferably R$^4$ is selected from methyl, ethyl, propyl and butyl. Still more preferably R$^4$ is methyl.

W$^-$ may be any counter ion. Representative examples of W$^-$ include halides (e.g. Br—, I—, Cl—), tosylate, mesylate and acetate. Additionally, W$^-$ may be a polycharged compound (e.g. a di or tri carbon/late) or polymer e.g. poly (carboxylate). Suitable polycharged compounds and polymers are discussed below in more detail.

In preferred surfactants of the invention, when X is a positively charged group, X is preferably not a terminal trialkyl ammonium group.

In further preferred surfactants of the invention, when X is a positively charged group, X is preferably not a —N$^+$(C$_2$H$_5$)$_2$(CH$_3$)W$^-$ group, wherein W$^-$ is a counter ion as hereinbefore defined above.

In further preferred surfactants of the invention, when X is a positively charged group, X is preferably not a —N$^+$(C$_2$H$_5$)$_2$(CH$_3$)I$^-$ group.

In further preferred surfactants of the invention, when X is a positively charged group, X preferably comprises a group selected from formula (IIb):

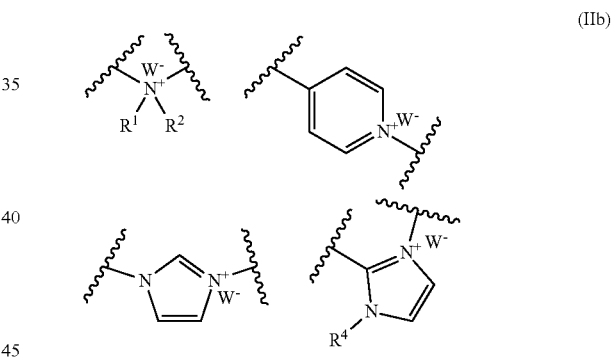

(IIb)

wherein
R$^1$ and R$^2$ are independently selected from H and C$_{1-6}$ alkyl, preferably methyl;
R$^4$ is selected from C$_{1-6}$ alkyl; and
W$^-$ is a counter ion.

The wavy line denotes where the X group is attached to the remainder of the surfactant. Thus on one side the X group is attached to L$_2$ where L$_2$ is present, otherwise (CH$_2$)$_b$ where b is 1 or more, or otherwise L$_1$. On the other side, X is preferably attached to a further organic group, Z. Thus in this group of compounds, X, the charged group, functions as linking group. In such surfactants the charged group is believed to advantageously generate a charge barrier in the aqueous droplet membrane that hinders or prevents the ability of small organic molecules, especially hydrophobic small organic molecules to pass through or across the membrane.

Preferably R$^1$ and R$^2$ are independently selected from C$_{1-6}$ alkyl. More preferably R$^1$ and R$^2$ are selected from methyl, ethyl, propyl and butyl. Still more preferably R$^1$ and R$^2$ are methyl.

W⁻ may be any counter ion. Representative examples of W⁻ include halides (e.g. Br—, I—, Cl—), tosylate, mesylate and acetate. Additionally, W⁻ may be a polycharged compound (e.g. a di or tri carboxylate) or polymer e.g. poly (carboxylate). Suitable polycharged compounds and polymers are discussed below in more detail.

In further preferred surfactants of the invention, when X is a positively charged group, X is preferably selected from formula (IIc):

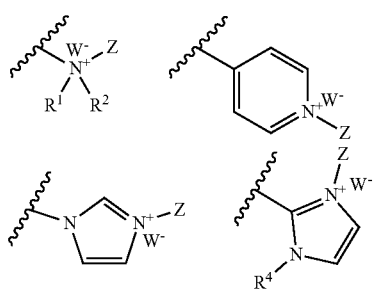

(IIc)

wherein
$R^1$ and $R^2$ are independently selected from H and $C_{1-6}$ alkyl, preferably methyl;
$R^4$ is selected from $C_{1-6}$ alkyl
Z is an organic group; and
W⁻ is a counter ion.

Preferably $R^1$ and $R^2$ are independently selected from $C_{1-6}$ alkyl. More preferably $R^1$ and $R^2$ are selected from methyl, ethyl, propyl and butyl. Still more preferably $R^1$ and $R^2$ are methyl.

W⁻ may be any counter ion. Representative examples of W⁻ include halides (e.g. Br—, I—, Cl—), tosylate, mesylate and acetate. Additionally, W⁻ may be a polycharged compound (e.g. a di or tri carboxylate) or polymer e.g. poly (carboxylate). Suitable polycharged compounds and polymers are discussed below in more detail.

Preferably Z is —(CH₂)ᵣO(CH₂CH₂O)g(CH₂)ₛ —X-(L₂)c-(CH₂)b(L₁)a-A, wherein r is a positive integer from 2 to 6, g is 0 or a positive integer from 1 to 100, s is 0 or a positive integer from 2 to 6, X is as hereinbefore defined in relation to formula IIb, and L₂, L₁, A, b and a are as defined in relation to formula (I).

Preferably r is 2 or 3 and more preferably 2. Preferably g is 5 to 50 and still more preferably 10 to 30. Preferably s is 0, 1, 2 or 3, more preferably 2 or 3 and still more preferably 2.

Preferably X is selected from:

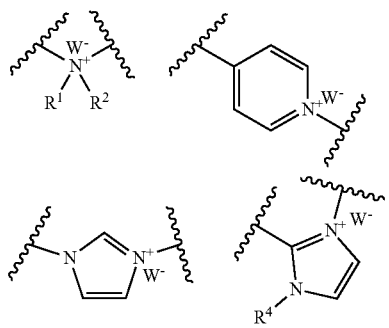

wherein
$R^1$ and $R^2$ are independently selected from H and $C_{1-6}$ alkyl, preferably methyl;
$R^4$ is selected from $C_{1-6}$ alkyl; and
W⁻ is a counter ion.

Preferred L₂, L₁, A, c, b and a are as set out above in relation to formula (I).

Preferred $R^1$, $R^2$, $R^4$ and W⁻ are as set out above in relation to formula (IIb).

When X is a positively charged group, preferred surfactants of the invention are selected from:

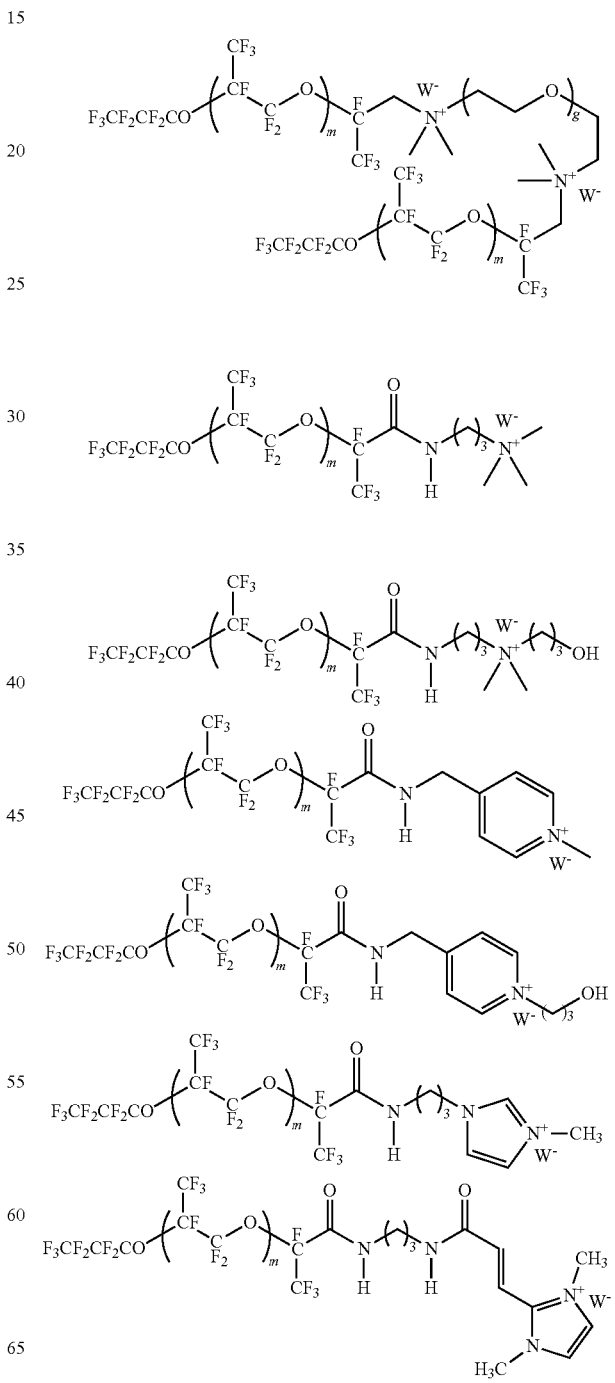

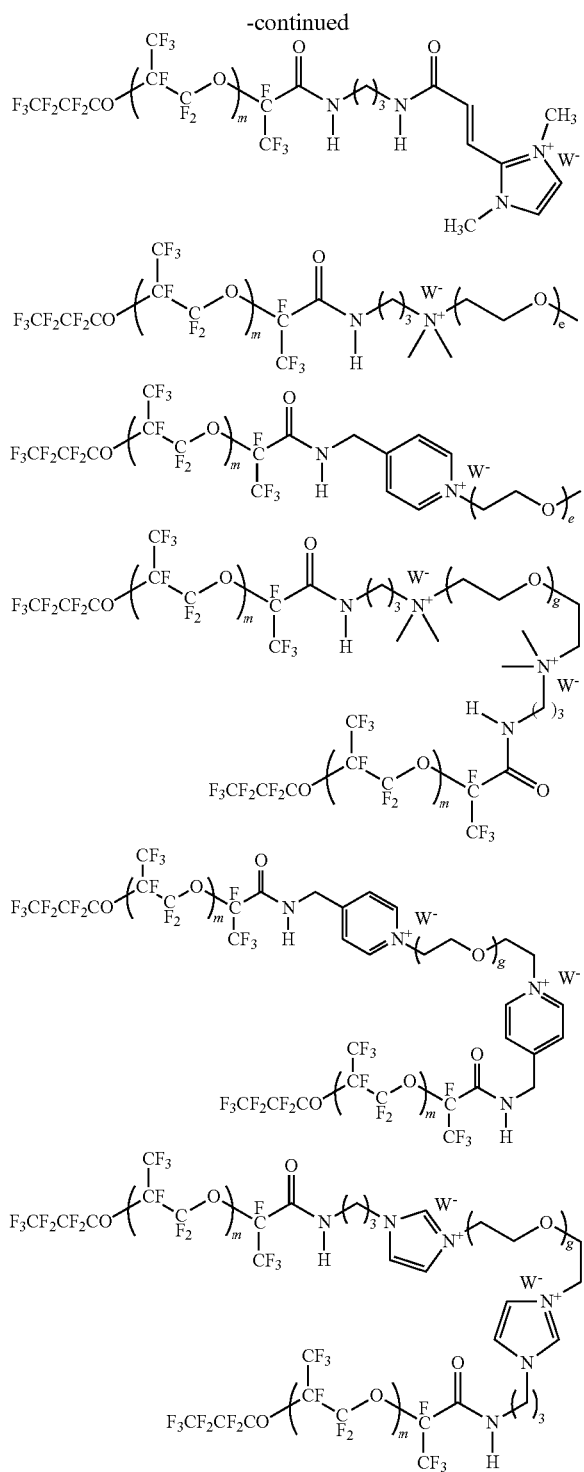

wherein m is preferably an integer from 1 to 100 (e.g. 1 to 50), more preferably an integer from 5 to 50 and particularly preferably an integer from 10 to 25, e is 0 or a positive integer, more preferably a positive integer from 1 to 100, still more preferably 5 to 50 and yet more preferably 10 to 30; and g is 0 or a positive integer from 1-100, preferably 5 to 50 and still more preferably 10 to 30.

When X is a zwitterionic charged group, A is preferably $CF_3CF_2CF_2O—[CF(CF_3)CF_2O]_m—CF(CF_3)—$, wherein m is a positive integer (e.g. 1 to 100). When X is a zwitterionic group a is preferably 0 or a is preferably 1 and $L_1$ is CONH or $CONCH_3$. When X is a zwitterionic group, b is preferably an integer from 1 to 10. When X is a zwitterionic group, c is preferably 0. Still more preferably when X is a zwitterionic group, A is $CF_3CF_2CF_2O$-$[CF(CF_3)CF_2O]_m$—$CF(CF_3)$—, wherein m is a positive integer (e.g. 1 to 100), a is 0 or a is 1 and $L_1$ is CONH or $CONCH_3$, b is an integer from 1 to 10 and c is 0.

In the surfactants of the present invention when X is a zwitterionic group, the zwitterionic group preferably comprises a quaternary nitrogen atom. In further preferred surfactants of the invention, when X is a zwitterionic group, X is preferably selected from formula IIIa:

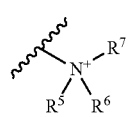

IIIa wherein $R^5$ is selected from H and $C_{1-6}$ alkyl;

$R^6$ is an $C_{1-6}$ alkyl group substituted by a $COO^-$ or $SO_3^-$ group; and $R^7$ is selected from H, $C_{1-6}$ alkyl and $(CH_2)_dO(CH_2CH_2O)_eR^x$, wherein $R^x$ is independently H or $C_{1-6}$ alkyl, d is a positive integer from 2 to 6, and e is 0 or a positive integer from 1 to 100, preferably 5 to 50 and more preferably 10 to 30;

or $R^5$ and $R^6$ are each independently selected from H and $C_{1-6}$ alkyl; and $R^7$ is $(CH_2)_o(CHQ)(CH_2)_p(H^x)_q(CH_2CH_2O)_eR^x$ wherein Q is a $COO^-$ or $SO_3^-$ group, $H^x$ is S or $SO_2$, each of o and p is 0 or an integer from 1 to 6 with the proviso that both of o and p cannot be 0, q is 1 or 0, $R^x$ is independently H or $C_{1-6}$ alkyl, and e is 0 or a positive integer from 1 to 100, preferably 5 to 50 and more preferably 10 to 30.

The wavy line denotes where the X group is attached to the remainder of the surfactant, i.e. $L_2$ where $L_2$ is present, otherwise $(CH_2)_b$ where b is 1 or more, otherwise $L_1$.

In some preferred surfactants of the present invention $R^5$ is selected from H and $C_{1-6}$ alkyl; $R^6$ is a $C_{1-6}$ alkyl group substituted by a $COO^-$ or $SO_3^-$ group; and $R^7$ is selected from H, $C_{1-6}$ alkyl and $(CH_2)_dO(CH_2CH_2O)_eR^x$, wherein $R^x$ is independently H or $C_{1-6}$ alkyl, d is a positive integer from 2 to 6, and e is 0 or a positive integer from 1 to 100, preferably 5 to 50 and more preferably 10 to 30.

Preferably $R^5$ is selected from $C_{1-6}$ alkyl. More preferably $R^5$ is selected from methyl, ethyl, propyl and butyl. Still more preferably $R^5$ is methyl.

Preferably $R^6$ is a $C_{1-6}$ alkyl group, more preferably a $C_{1-3}$ alkyl group, and still more preferably a $C_1$ alkyl group, substituted by a $COO^-$ Preferably $R^7$ is selected from $C_{1-6}$ alkyl and $(CH_2)_dO(CH_2CH_2O)_eR^x$, wherein $R^x$ is independently H or $C_{1-6}$ alkyl, d is 2, and e is 0 or a positive integer from 1 to 100, preferably 5 to 50 and more preferably 10 to 30. When $R^7$ is $C_{1-6}$ alkyl, it is preferably methyl. When $R^7$ is $(CH_2)_dO(CH_2CH_2O)_eR^x$, $R^x$ is preferably $C_{1-6}$ alkyl (e.g. methyl), d is a positive integer from 2 to 6 (e.g. 2), and e is a positive integer from 1 to 100, preferably 5 to 50 and more preferably 10 to 30.

In other preferred surfactants of the invention $R^5$ and $R^6$ are each independently selected from H and $C_{1-6}$ alkyl; and $R^7$ is $(CH_2)_o(CHQ)(CH_2)_p(H^x)_q(CH_2CH_2O)_eR^x$ wherein Q is a $COO^-$ or $SO_3^-$ group, $H^x$ is S or $SO_2$, each of o and p is 0 or an integer from 1 to 6 with the proviso that both of o and p cannot be 0, q is 1 or 0, $R^x$ is independently H or $C_{1-6}$ alkyl, and e is 0 or a positive integer from 1 to 100, preferably 5 to 50 and more preferably 10 to 30

Preferably $R^5$ and $R^6$ are H or $CH_3$ and more preferably H.

Preferably $R^7$ is $(CH_2)_o(CHQ)(CH_2)_p(H^x)_q(CH_2CH_2O)_eR^x$ wherein Q is a $COO^-$ group, $H^x$ is S or $SO_2$, each of o and p is 0 or an integer from 1 to 6 with the proviso that both of o and p cannot be 0, q is 1 or 0, $R^x$ is $C_{1-6}$ alkyl, and e is 0 or a positive integer from 1 to 100, preferably 5 to 50 and more preferably 10 to 30. Preferably o is 0. Preferably p is 1. Preferably e is 5 to 50 and more preferably 10 to 30. One preferred $R^7$ group is —$CH(COO^-)CH_2SO_2(CH_2CH_2O)_eCH_3$ wherein e is 0 or a positive integer from 1 to 100, preferably 5 to 50 and more preferably 10 to 30.

In further preferred surfactants of the invention, when X is a zwitterionic group, X comprises a group selected from formula (IIIbi) or (IIIbii):

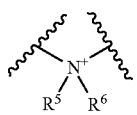

IIIbi wherein
$R^5$ is selected from H and $C_{1-6}$ alkyl; and
$R^6$ is an alkyl group substituted by a $COO^-$ or $SO_3^-$ group;
or

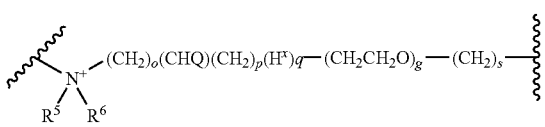

IIIbii wherein
$R^5$ and $R^6$ are each independently selected from H and $C_{1-6}$ alkyl;
Q is a $COO^-$ or $O_3^-$ group;
$H^x$ is S or $SO_2$;
each of o and p is 0 or an integer from 1 to 6, with the proviso that both of o and p cannot be 0;
q is 1 or 0;
g is 0 or a positive integer from 1 to 100; and
s is 0 or a positive integer from 2 to 6.

When X comprises a group:

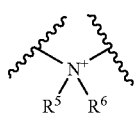

preferably $R^5$ is selected from $C_{1-6}$ alkyl. More preferably $R^5$ is selected from methyl, ethyl, propyl and butyl. Still more preferably $R^5$ is methyl. Preferably $R^6$ is a $C_{1-6}$ alkyl group, more preferably a $C_{1-3}$ alkyl group, and still more preferably a $C_1$ alkyl group, substituted by a $COO^-$ When X comprises a group:

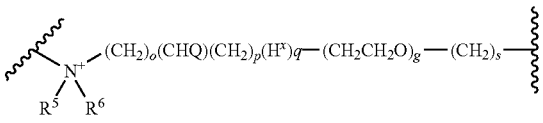

preferably $R^5$ and $R^6$ are H or $CH_3$ and more preferably H. Preferably Q is a $COO^-$ group, $H^x$ is S or $SO_2$, each of o and p is 0 or an integer from 1 to 6 with the proviso that both of o and p cannot be 0, q is 1 or 0, g is a positive integer from 1 to 100, preferably 5 to 50 and more preferably 10 to 30 and s is 0 or a positive integer from 2 to 6. Preferably o is 0. Preferably p is 1. Preferably g is 5 to 50 and more preferably 10 to 30. Preferably s is 2.

The wavy lines denote where the X group is attached to the remainder of the surfactant. Thus on one side the X group is attached to $L_2$ where $L_2$ is present, otherwise $(CH_2)_b$ where b is 1 or more, or otherwise $L_1$. On the other side, X is preferably attached to a further organic group, Z. Thus, in this group of compounds, X, the charged group, functions as linking group and is present as a charge barrier within the droplet membrane to hinder or prevent the passage of hydrophobic molecules therethrough.

In further preferred surfactants of the invention, when X is a zwitterionic group, X is selected from formula (IIIc):

(IIIc)

wherein
$R^5$ is selected from H and $C_{1-6}$ alkyl;
$R^6$ is an alkyl group substituted by a $COO^-$ or $SO_3^-$ group; and
Z is an organic group.

Preferably $R^5$ is selected from $C_{1-6}$ alkyl. More preferably $R^5$ is selected from methyl, ethyl, propyl and butyl. Still more preferably $R^5$ is methyl. Preferably $R^6$ is a $C_{1-6}$ alkyl group, more preferably a $C_{1-3}$ alkyl group, and still more preferably a $C_1$ alkyl group, substituted by a $COO^-$ Preferable Z is —$(CH_2)_rO(CH_2CH_2O)_g(CH_2)_s$—X-$(L_2)_c$-$(CH_2)_b$-$(L_1)_a$-A, wherein r is a positive integer from 2 to 6, g is 0 or a positive integer (e.g. 1 to 100), s is 0 or a positive integer from 2 to 6, X is as hereinbefore defined in relation to formula (IIIbi) and (IIIbii), and $L_2$, $L_1$, A, c, b and a are as defined in relation to formula (I).

Preferably r is 2 or 3 and more preferably 2. Preferably g is 5 to 50 and still more preferably 10 to 30. Preferably s is 0, 1, 2 or 3, more preferably 2 or 3 and still more preferably 2.

Preferably X is selected from:

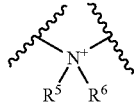

wherein

R[5] is selected from H and $C_{1-6}$ alkyl; and

R[6] is an alkyl group substituted by a COO[−] or $SO_3^-$ group;

or

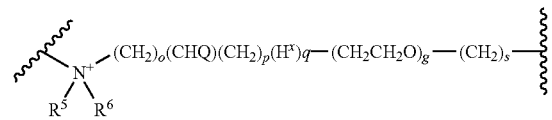

wherein

R[5] and R[6] are each independently selected from H and $C_{1-6}$ alkyl;

Q is a COO[−] or $SO_3^-$ group;

H[x] is S or $SO_2$;

each of o and p is 0 or an integer from 1 to 6, with the proviso that both of o and p cannot be 0;

q is 1 or 0;

g is 0 or a positive integer from 1 to 100; and s is 0 or a positive integer from 2 to 6.

Preferred $L_2$, $L_1$, A, c, b and a are as set out above in relation to formula (I).

When X is a zwitterionic group, preferred surfactants of the invention are selected from:

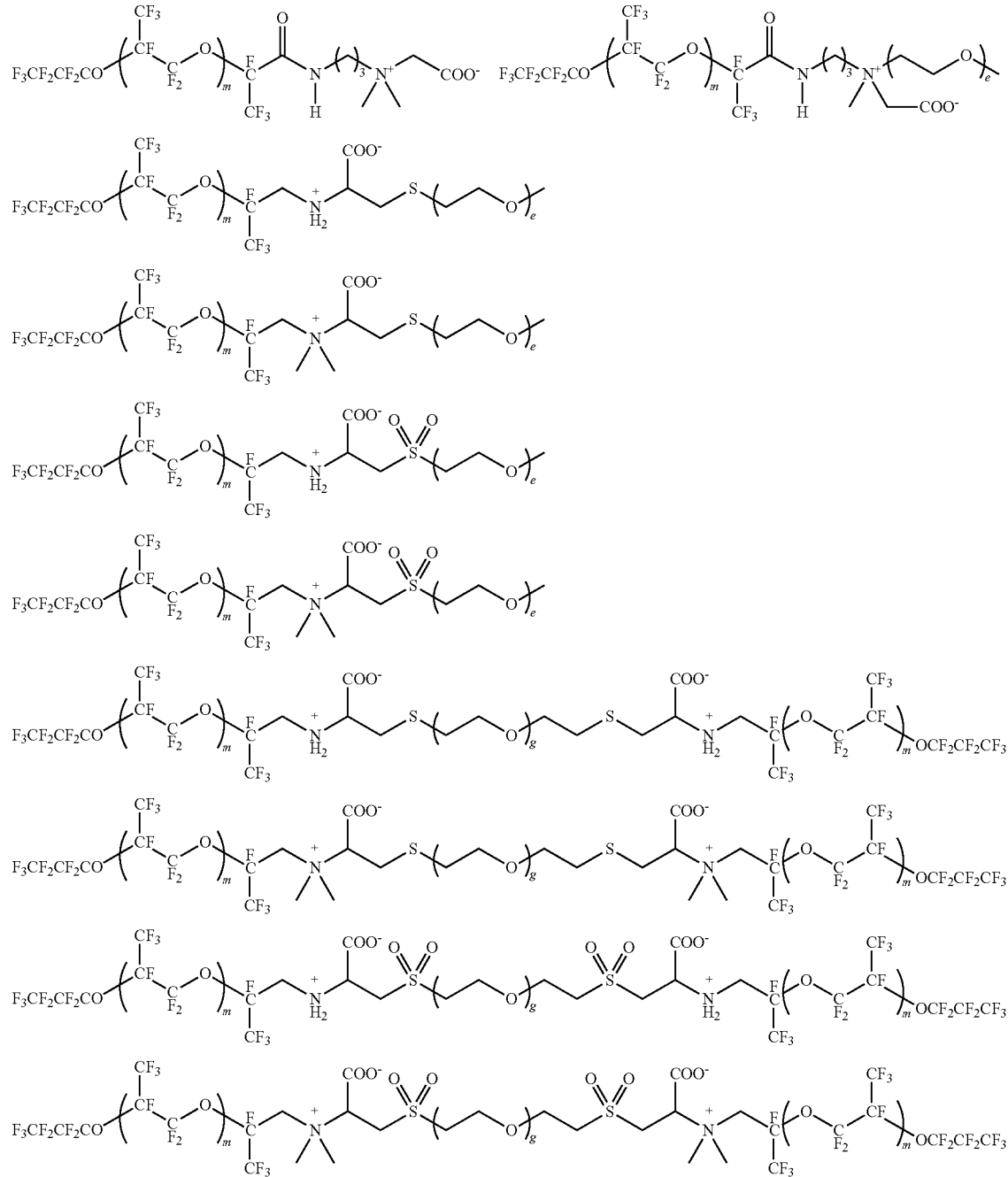

-continued

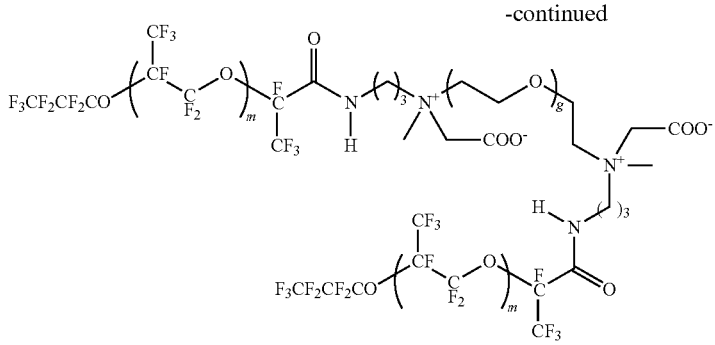

wherein
- m is preferably an integer from 1 to 100 (e.g. 1 to 50), more preferably an integer from 5 to 50 and particularly preferably an integer from 10 to 25,
- e is 0 or a positive integer, more preferably a positive integer from 1 to 100, still more preferably 5 to 50 and yet more preferably 10 to 30; and
- g is 0 or a positive integer from 1-100, preferably 5 to 50 and still more preferably 10 to 30.

When X is a negatively charged group, A is preferably $CF_3CF_2CF_2O—[CF(CF_3)CF_2O]_m—CF(CF_3)—$, wherein m is a positive integer (e.g. 1 to 100). When X is a negatively charged group a is preferably 0. When X is a negatively charged group, b is preferably an integer from 1 to 10. When X is a negatively charged group, c is preferably 0. Still more preferably when X is a negatively charged group, A is $CF_3CF_2CF_2O—[CF(CF_3)CF_2O]_m—CF(CF_3)—$, wherein m is a positive integer (e.g. 1 to 100), a is 0, b is an integer from 1 to 10 and c is 0.

In the surfactants of the present invention when X is a negatively charged group, the negatively charged group preferably comprises a carboxylate group, a phosphate group or a sulphate group.

In further preferred surfactants of the invention, when X is a negatively charged group, X is preferably selected from formula (IVa):

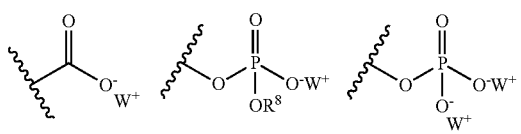

(IVa)

wherein
$R^8$ is selected from H, $C_{1-6}$ alkyl and $(CH_2)_d(CH_2CH_2O)_eR^x$, wherein $R^x$ is independently H or $C_{1-6}$ alkyl, d is a positive integer from 1 to 6, and e is a positive integer from 1 to 100, preferably 5 to 50 and more preferably 10 to 30; and
$W^+$ is a counter ion.

The wavy line denotes where the X group is attached to the remainder of the surfactant, i.e. $L_2$ where $L_2$ is present, otherwise $(CH_2)_b$ where b is 1 or more, otherwise $L_1$.

Preferably $R^8$ is selected from $C_{1-6}$ alkyl and $(CH_2)_d(CH_2CH_2O)_eR^x$, wherein $R^x$ is $C_{1-6}$ alkyl, d is a positive integer from 1 to 6 and e is a positive integer from 1 to 100 and e is a positive integer from 1 to 100, preferably 5 to 50 and still more preferably 10 to 30.

$W^+$ may be any counter ion. Representative examples of $W^+$ include $H^+$ and $Na^+$. Additionally, $W^+$ may be a poly-charged positive compound or polymer. Suitable poly-charged compounds and polymers are discussed below in more detail.

In further preferred surfactants of the invention, when X is a negatively charged group, X preferably comprises a group selected from formula (IVb):

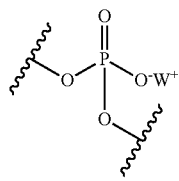

IVb wherein
$W^+$ is a counter ion, e.g. $H^+$ or $Na^+$.

The wavy lines denote where the X group is attached to the remainder of the surfactant. Thus on one side the X group is attached to $L_2$ where $L_2$ is present, otherwise $(CH_2)_b$ where b is 1 or more, or otherwise $L_1$. On the other side, X is preferably attached to a further organic group, Z. Thus, in this group of compounds, X, the charged group, functions as linking group. It is also thought that the X group functions as a charge barrier within the droplet membrane and prevents or hinders the passage of hydrophobic molecules therethrough.

In further preferred surfactants of the invention, when X is a negatively charged group, X is preferably selected from formula (IVc):

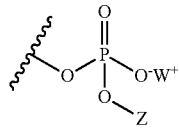

IVc wherein

Z is an organic group; and $W^+$ is a counter ion.

Preferably Z is selected from:

—$(CH_2)_rO(CH_2CH_2O)_g(CH_2)_s$—X-$(L_2)_c$-$(CH_2)_b$-$(L_1)_a$-A; and

—$(CH_2)_tCH_u[(CH_2)_rO(CH_2CH_2O)_gR^x]_w[(CH_2)_t$—X-$(L_2)_c$-$(CH_2)_b$-$(L_1)_a$-A$]_y$, wherein r is a positive integer from 2 to 6, t is a positive integer from 1 to 6, u is 0 or 1, w and y is 1 or 2, the sum of u, w and y equals to 3, g is 0 or a positive integer, s is 0 or a positive integer from 2 to 6, $R^x$ is independently H or $C_{1-6}$ alkyl, X is as defined in formula (IVb), and $L_2$, $L_1$, A, c, b and a are as defined in formula (I).

Preferably r is 1, 2 or 3 and more preferably 1 or 2. Preferably g is 5 to 50 and still more preferably 10 to 30. Preferably s is 0, 1, 2 or 3, more preferably 2 or 3 and still more preferably 2.

Preferably X is selected from:

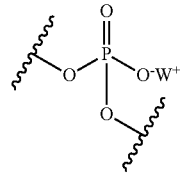

wherein $W^+$ is a counter ion, e.g. $H^+$ or $Na^+$.

Preferred $L_2$, $L_1$, A, c, b and a are as set out above in relation to formula (I).

When X is a negatively charged group, preferred surfactants of the invention are selected from:

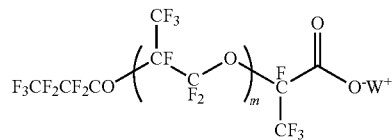

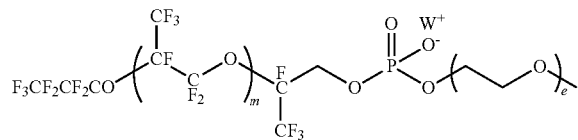

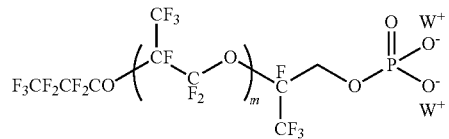

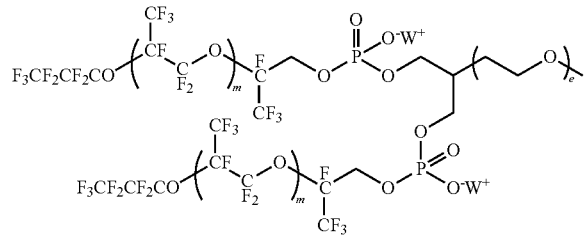

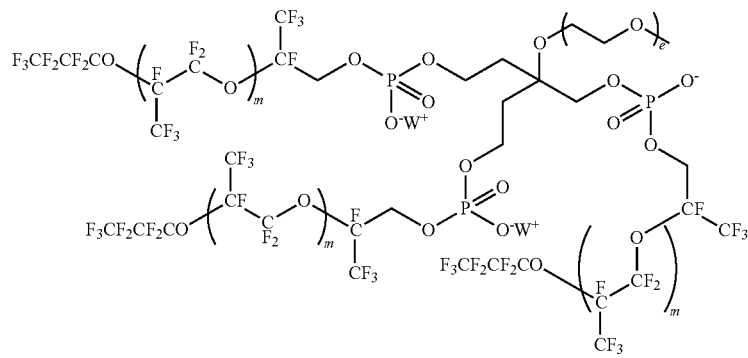

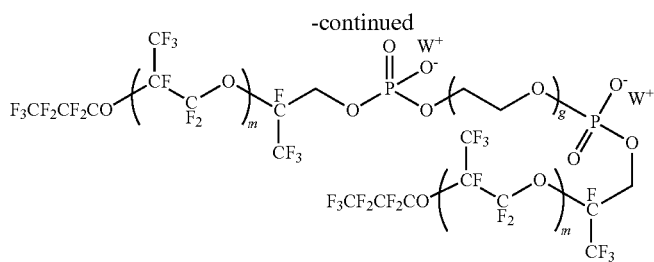

wherein
m is preferably an integer from 1 to 100 (e.g. 1 to 50), more preferably an integer from 5 to 50 and particularly preferably an integer from 10 to 25, e is 0 or a positive integer, more preferably a positive integer from 1 to 100, still more preferably 5 to 50 and yet more preferably 10 to 30; and g is 0 or a positive integer from 1-100, preferably 5 to 50 and still more preferably 10 to 30.

The surfactants of the present invention may be grouped according to the nature of the group X instead of the type of charge on the group. Another group of preferred surfactants of the present invention are those of formula (I-I), wherein X is selected from:

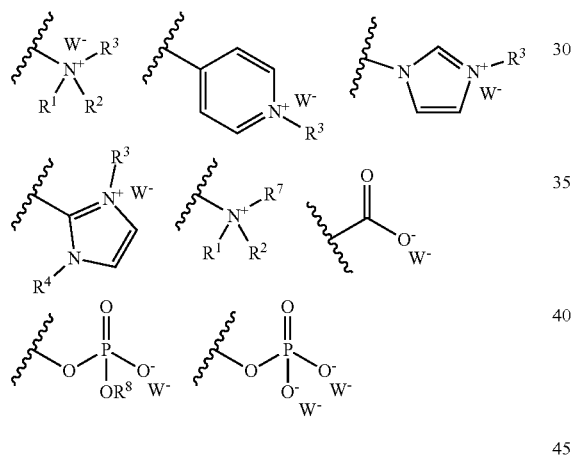

wherein
R$^1$ and R$^2$ are independently selected from H and C$_{1-6}$ alkyl, preferably methyl;

R$^3$ is selected from C$_{1-6}$ alkyl, and (CH$_2$)$_d$O(CH$_2$CH$_2$O)$_e$R$^x$, wherein R$^x$ is H or C$_{1-6}$ alkyl, d is a positive integer from 2 to 6, and e is 0 or a positive integer from 1 to 100, preferably 5 to 50 and more preferably 10 to 30;

R$^4$ is selected from C$_{1-6}$ alkyl;

R$^5$ is selected from H and C$_{1-6}$ alkyl; R$^6$ is an C$_{1-6}$ alkyl group substituted by a COO$^-$ or SO$_3^-$ group; and R$^7$ is selected from H, C$_{1-6}$ alkyl, and (CH$_2$)$_d$O(CH$_2$CH$_2$O)$_e$R$^x$, wherein R$^x$ is independently H or C$_{1-6}$ alkyl, d is a positive integer from 2 to 6, and e is 0 or a positive integer from 1 to 100, preferably 5 to 50 and more preferably 10 to 30; or R$^5$ and R$^6$ are each independently selected from H and C$_{1-6}$ alkyl; and R$^7$ is (CH$_2$)$_o$(CHQ)(CH$_2$)$_p$(H$^x$)$_q$(CH$_2$CH$_2$O)$_e$R$^x$ wherein Q is a COO$^-$ or SO$_3^-$ group, H$^x$ is S or SO$_2$, each of o and p is 0 or an integer from 1 to 6 with the proviso that both of o and p cannot be 0, q is 1 or 0, R$^x$ is independently H or C$_{1-6}$ alkyl, and e is 0 or a positive integer from 1 to 100, preferably 5 to 50 and more preferably 10 to 30;

R$^8$ is selected from H, C$_{1-6}$ alkyl and (CH$_2$)$_d$O(CH$_2$CH$_2$O)$_e$R$^x$, wherein R$^x$ is independently H or C$_{1-6}$ alkyl, d is a positive integer from 2 to 6, and e is a positive integer from 1 to 100, preferably 5 to 50 and more preferably 10 to 30; and W$^-$ and W$^+$ are counter ions.

Preferred R$^1$, R$^2$, R$^3$, R$^4$, R$^5$, R$^6$, R$^7$, R$^8$, Q, H$^x$, d, e, o, p, q and R$^x$ are as hereinbefore defined above. Preferably, X is not a terminal trialkyl ammonium group. More preferably, X is not a —N$^+$(C$_2$H$_5$)$_2$(CH$_3$)W$^-$ group, wherein W$^-$ is a counter ion as hereinbefore defined above. Even more preferably, X is not a —N$^+$(C$_2$H$_5$)$_2$(CH$_3$)I$^-$ group. Particularly preferred surfactants of this group are selected from:

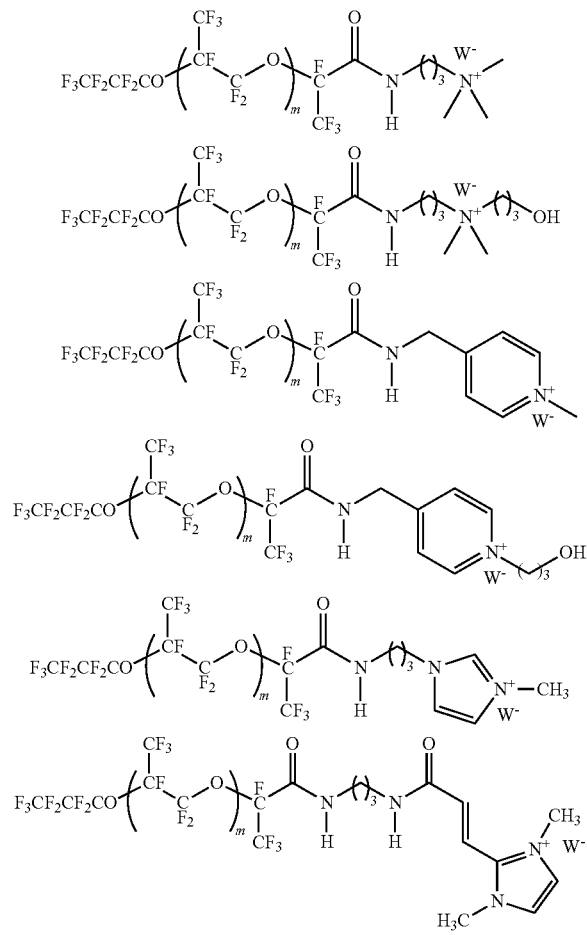

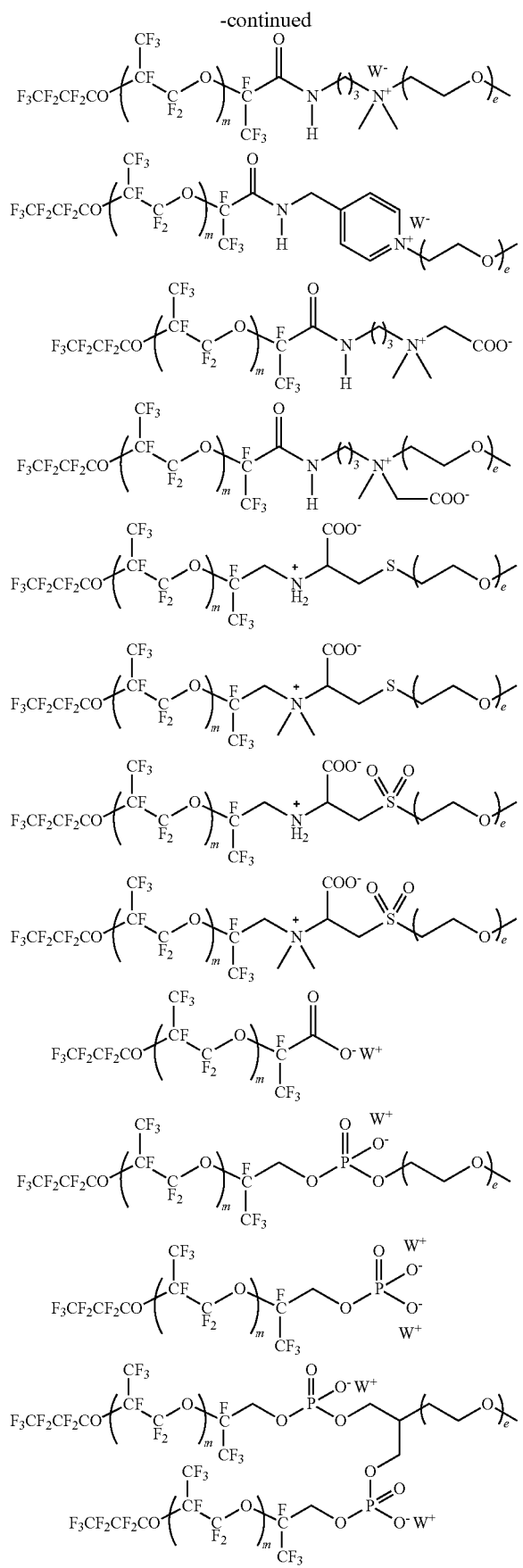

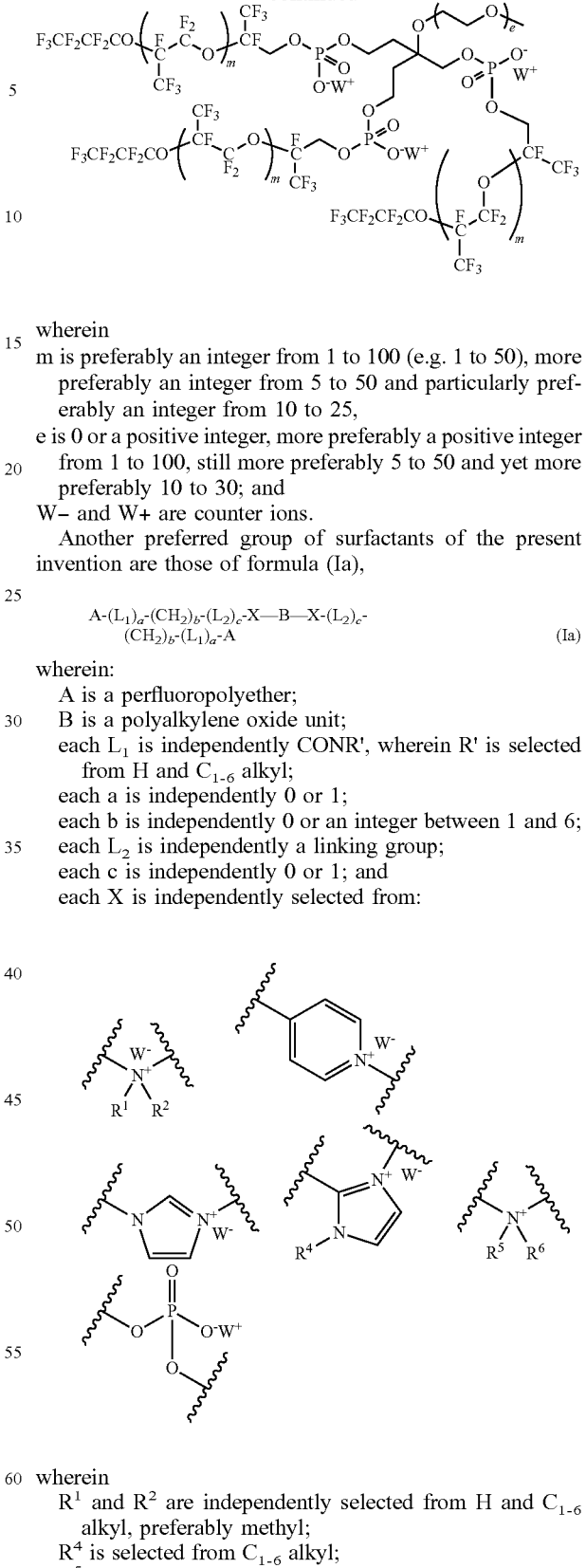

wherein
m is preferably an integer from 1 to 100 (e.g. 1 to 50), more preferably an integer from 5 to 50 and particularly preferably an integer from 10 to 25,
e is 0 or a positive integer, more preferably a positive integer from 1 to 100, still more preferably 5 to 50 and yet more preferably 10 to 30; and
W− and W+ are counter ions.

Another preferred group of surfactants of the present invention are those of formula (Ia), $$A\text{-}(L_1)_a\text{-}(CH_2)_b\text{-}(L_2)_c\text{-}X\text{—}B\text{—}X\text{-}(L_2)_c\text{-}(CH_2)_b\text{-}(L_1)_a\text{-}A \quad \text{(Ia)}$$

wherein:
A is a perfluoropolyether;
B is a polyalkylene oxide unit;
each $L_1$ is independently CONR', wherein R' is selected from H and $C_{1-6}$ alkyl;
each a is independently 0 or 1;
each b is independently 0 or an integer between 1 and 6;
each $L_2$ is independently a linking group;
each c is independently 0 or 1; and
each X is independently selected from:

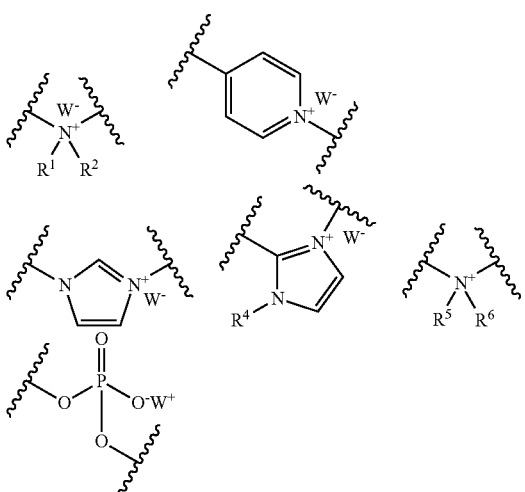

wherein
$R^1$ and $R^2$ are independently selected from H and $C_{1-6}$ alkyl, preferably methyl;
$R^4$ is selected from $C_{1-6}$ alkyl;
$R^5$ is selected from H and $C_{1-6}$ alkyl;
$R^6$ is an alkyl group substituted by a COO− or $SO_3^−$ group; and
W− and W+ are counter ions.

Preferred $R^1$, $R^2$, $R^4$, $R^5$ and $R^6$ are as hereinbefore defined above.

Preferably B is comprises a unit of the formula —[CH$_2$CH$_2$O]g-, wherein g is a positive integer. Optionally each B further comprises one or more (CH$_2$)$_r$O and/or —(CH$_2$)s- groups wherein s and r are each independently selected from a positive integer from 2 to 6. In some preferred surfactants of the present invention, each B consists of a unit of the formula —[CH$_2$]$_r$O—[CH$_2$CH$_2$O]g-[CH$_2$]$_s$—, wherein g is a positive integer and r and s are each independently 0, 1, 2, 3, 4 or 5. Preferably r and s are each independently 0, 1, 2 or 3. In some preferred surfactants of the invention both r and s are 0, i.e. B consists of the formula —[CH$_2$CH$_2$O]$_g$—. In other preferred surfactants r is 0 and s is 2, i.e. B consists of the formula —[CH$_2$CH$_2$O]$_g$—CH$_2$CH$_2$—. Preferably g is an integer from 1 to 100, more preferably 5 to 50, and yet more preferably 10 to 30.

Particularly preferred surfactants of this group are selected from:

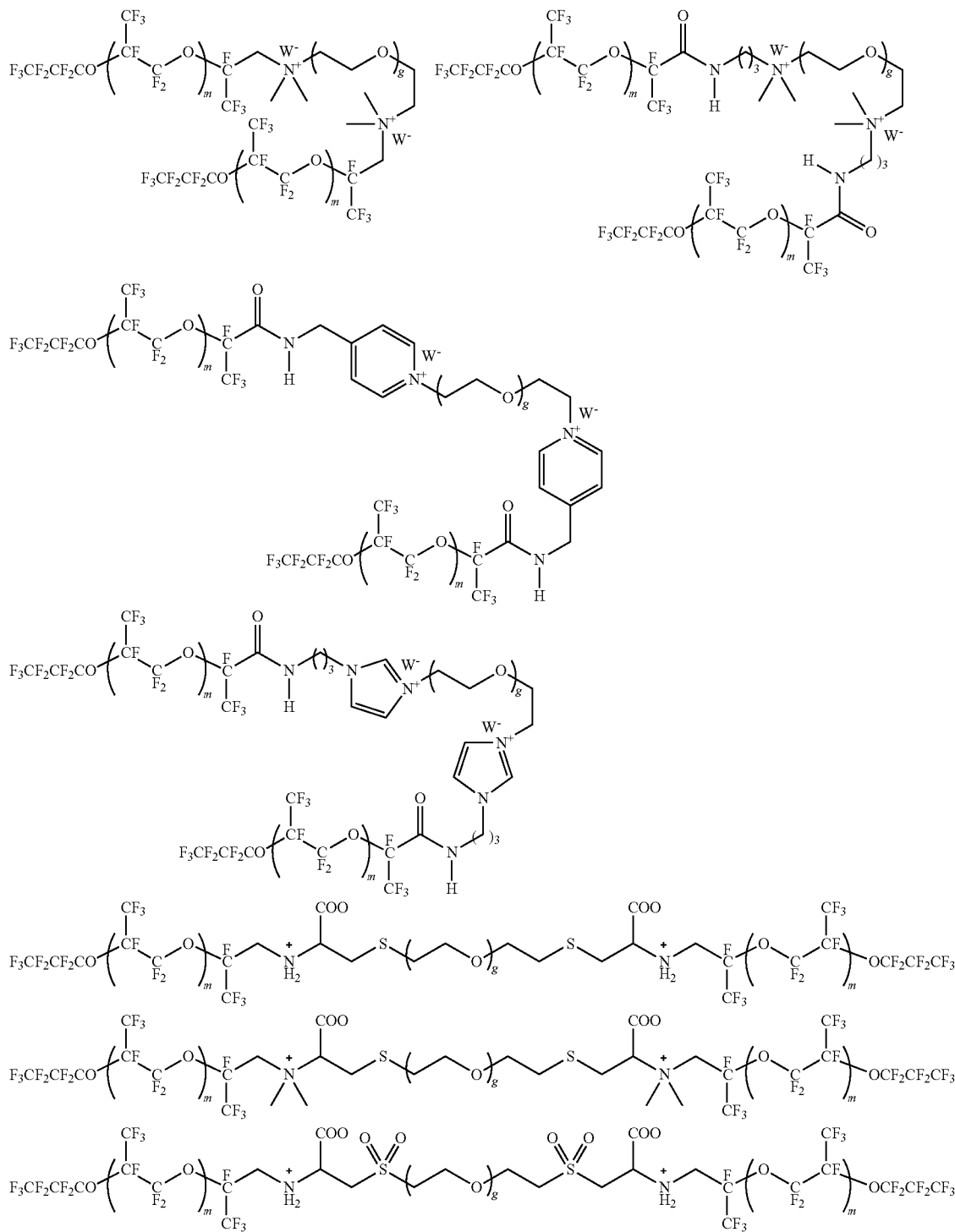

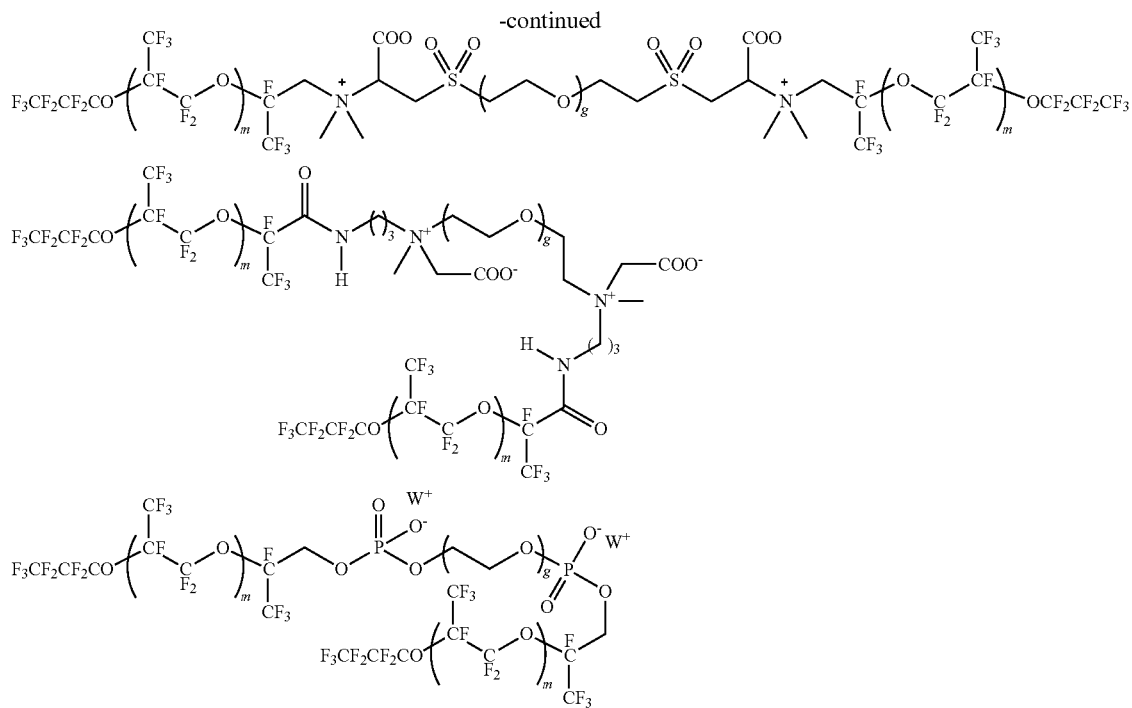
wherein
m is preferably an integer from 1 to 100 (e.g. 1 to 50), more preferably an integer from 5 to 50 and particularly preferably an integer from 10 to 25;
g is 0 or a positive integer from 1-100, preferably 5 to 50 and still more preferably 10 to 30; and
W− and W+ are counter ions.
Preferred surfactants of the present invention are selected from:
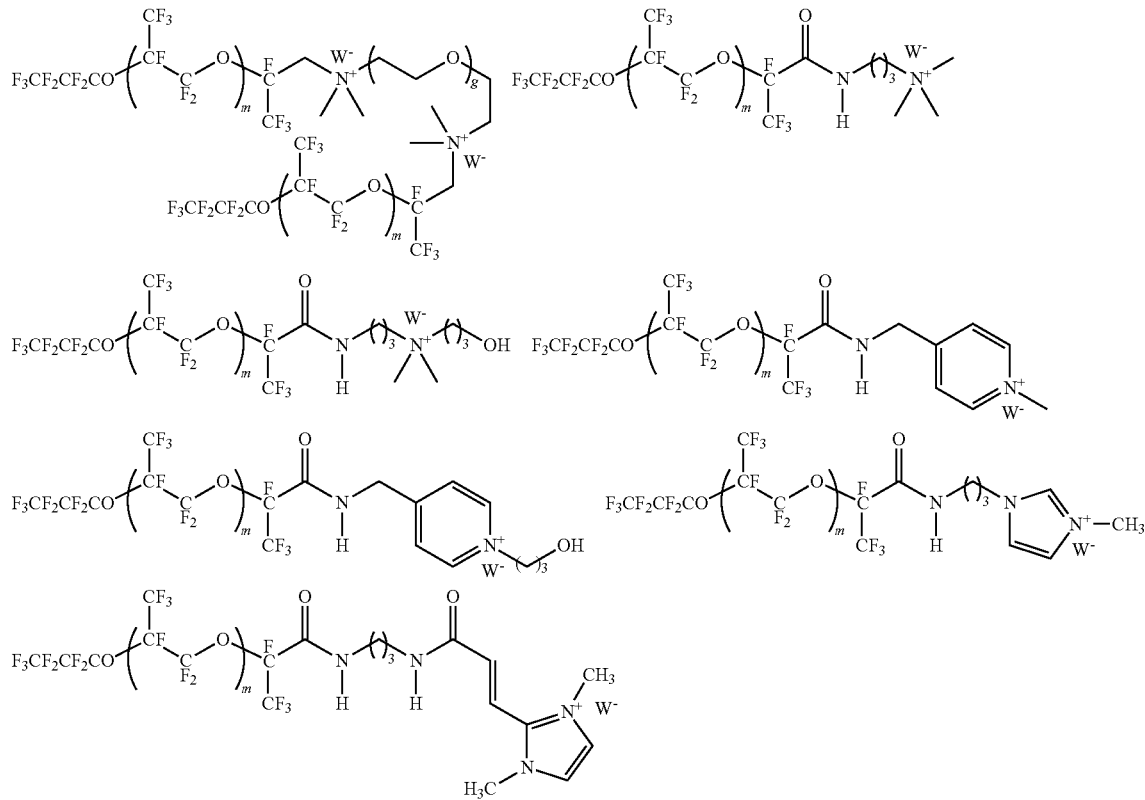

-continued
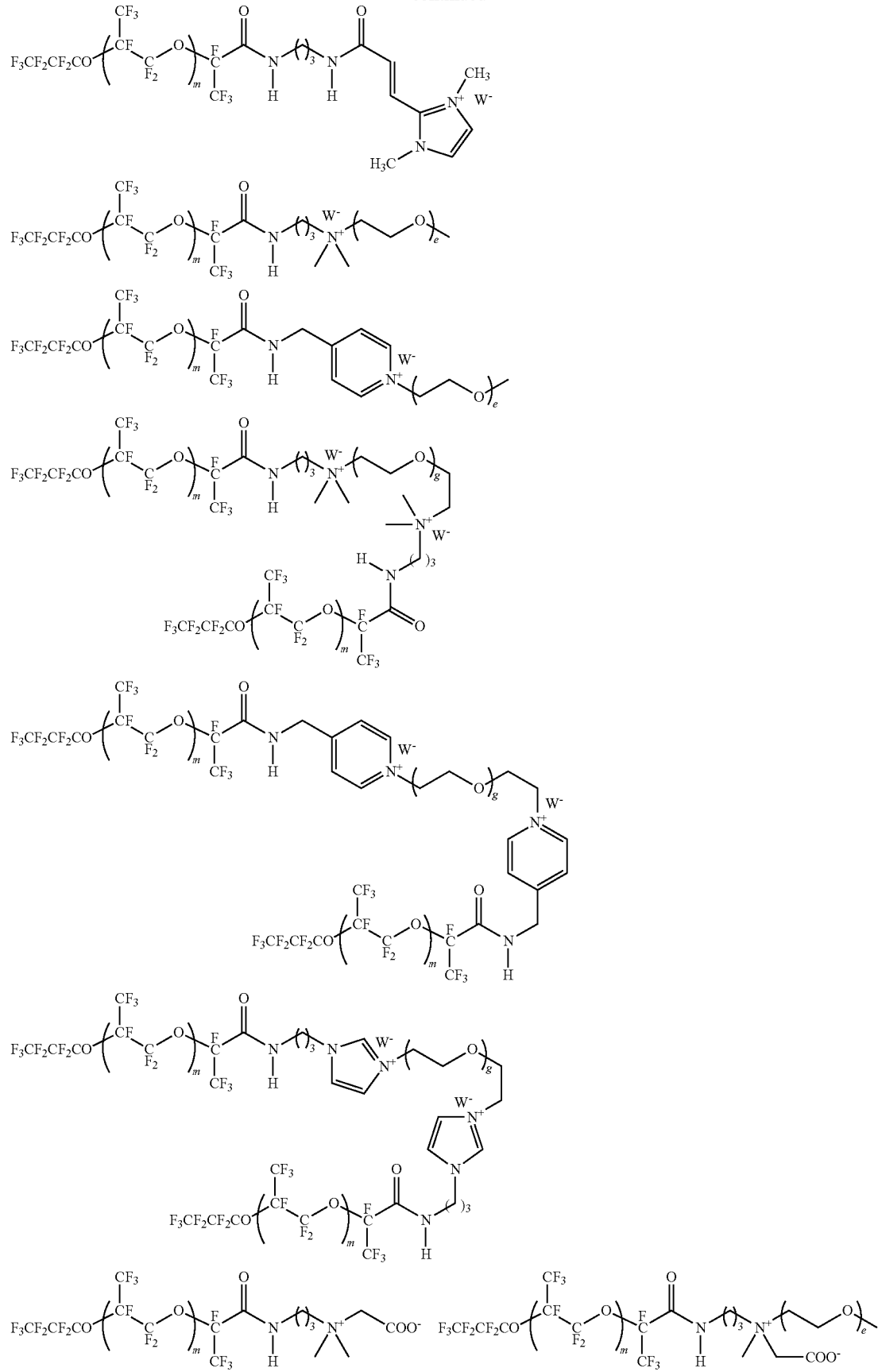

-continued
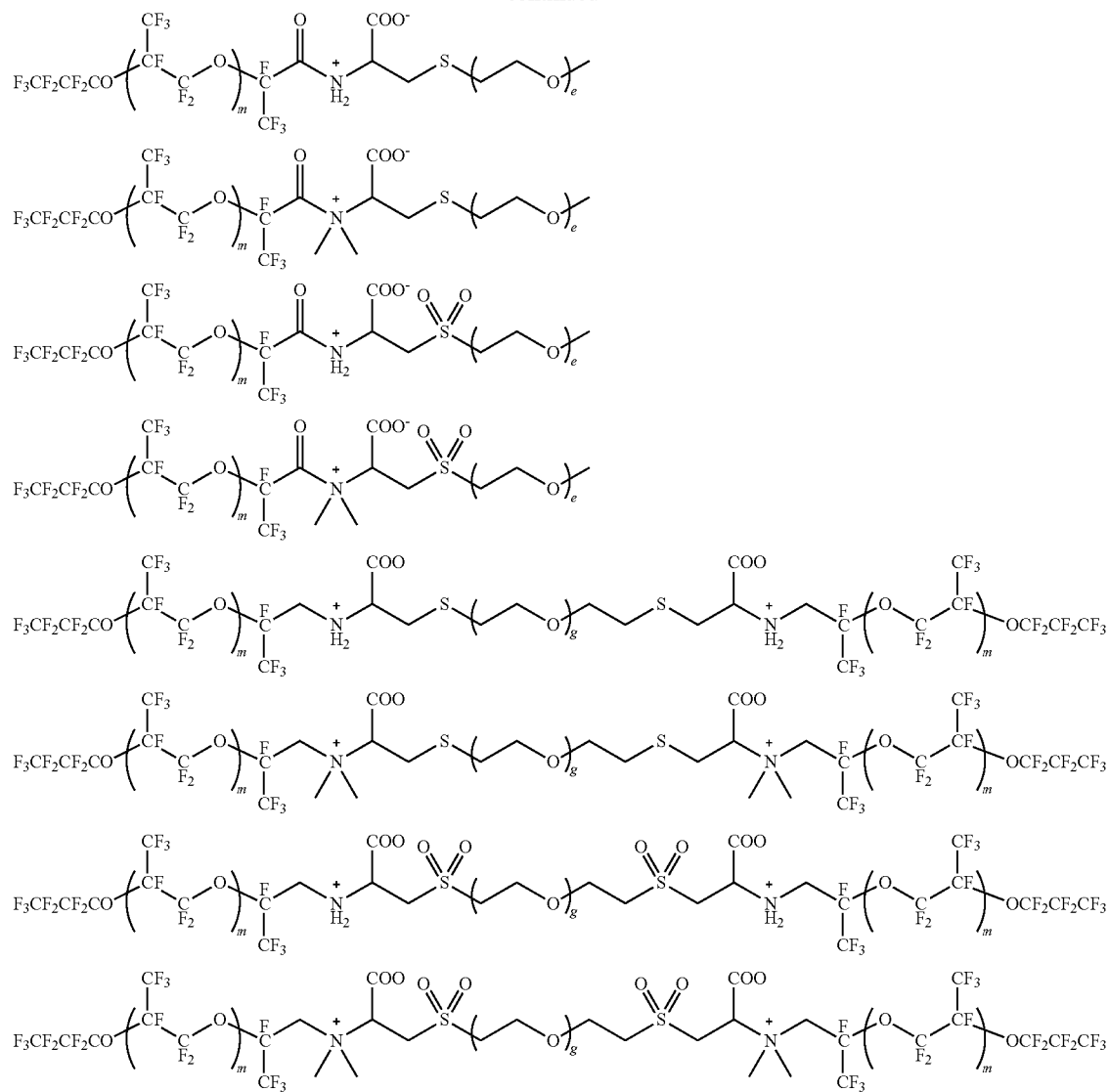
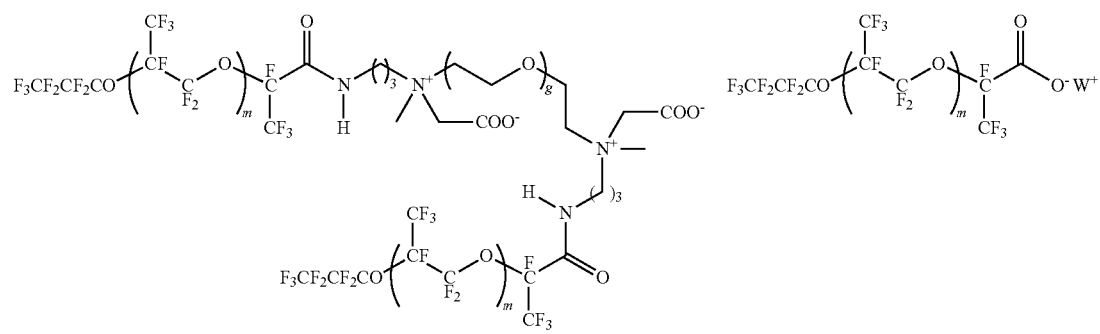
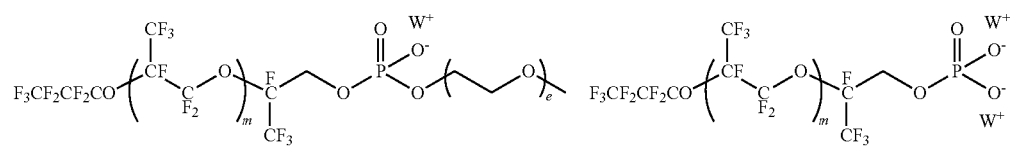

-continued

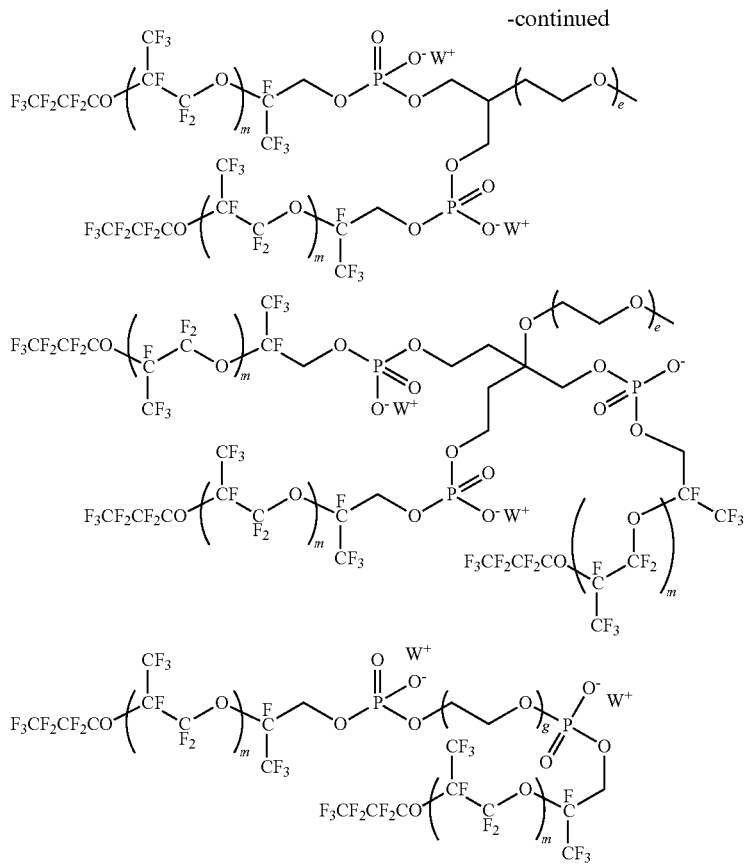

Preferred surfactants of the present invention have a weight average molecular weight of 500 to 20,000 Da, more preferably 2,000 to 15,000 Da and yet more preferably 3,000 to 10,000 Da.

The present invention also relates to methods for making the surfactants as hereinbefore defined. The surfactants may be prepared using conventional reactions from commercially available starting materials.

For instance, surfactants of formula (I),

wherein
A, $L_1$, a, b, $L_2$ is a linking group and c are as defined in formula (I) and X is

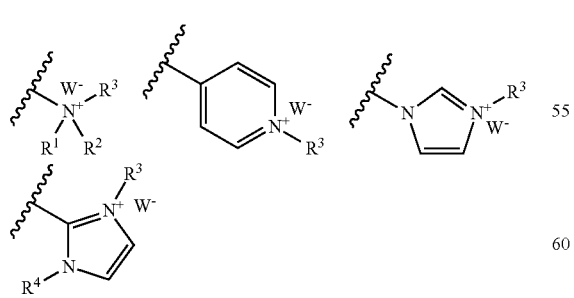

wherein
$R^1$-$R^4$ and W are as defined in formula (IIa), and preferably, X is not a terminal trialkyl ammonium group, more preferably, X is not a —$N^+(C_2H_5)_2(CH_3)W^-$ group, wherein $W^-$ is a counter ion as hereinbefore defined above, and even more preferably, X is not a —$N^+(C_2H_5)_2(CH_3)I^-$ group,
may be prepared by a method comprising reacting a compound of formula (a): A-$(L_1)_a$-$(CH_2)_b$-$(L_2)_c$-X' (a)
wherein A, $L_1$, a, b, $L_2$ is a linking group and c are as defined in formula (I) and X' is:

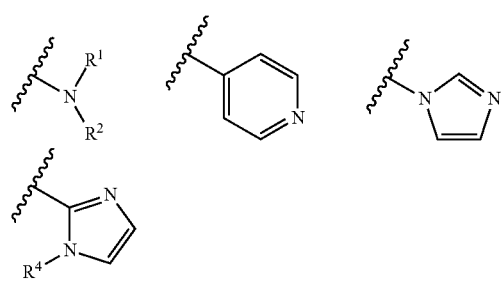

wherein
$R^1$ and $R^2$ are independently selected from H and $C_{1-6}$ alkyl, preferably methyl; and $R^4$ is selected from $C_{1-6}$ alkyl;
with $R^3$—W, wherein
$R^3$ is selected from $C_{1-6}$ alkyl, and $(CH_2)_dO(CH_2CH_2O)_eR^x$, wherein $R^x$ is H or $C_{1-6}$ alkyl, d is a positive integer from 2 to 6, and e is 0 or a positive integer from 1 to 100, preferably 5 to 50 and more preferably 10 to 30; or with W—(CH$_2$)$_r$O(CH$_2$CH$_2$O)$_g$(CH$_2$)$_s$—W, wherein r is a positive integer from 2 to 6, g is 0 or a positive integer, s is 0 or a positive integer from 2 to 6; and W is a leaving group.

Similarly, surfactants of formula (I),

A-(L$_1$)$_a$-(CH$_2$)$_b$-(L$_2$)$_c$-X  (I)

wherein

A, L$_1$, a, b, L$_2$ is a linking group and c are as defined in formula (I) and X is

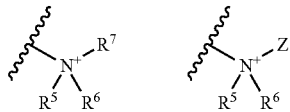

wherein

R$^5$-R$^7$ are as defined in formula (IIIa);

may be prepared by a method comprising reacting a compound of formula (a): A-(L$_1$)$_a$-(CH$_2$)$_b$-(L$_2$)$_c$-X' (a)

wherein A, L$_1$, a, b, L$_2$ is a linking group and c are as defined in formula (I) and X' is:

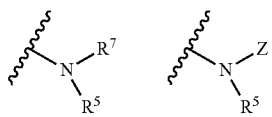

wherein

R$^5$ is selected from H and C$_{1-6}$ alkyl; and

R$^7$ is selected from H, C$_{1-6}$ alkyl, (CH$_2$)$_d$O(CH$_2$CH$_2$O)$_e$R$^x$, wherein R$^x$ is independently H or C$_{1-6}$ alkyl, d is a positive integer from 2 to 6, and e is 0 or a positive integer from 1 to 100, preferably 5 to 50 and more preferably 10 to 30;

Z is —(CH$_2$)$_r$O(CH$_2$CH$_2$O)$_g$(CH$_2$)$_s$—X-(L$_2$)$_c$-(CH$_2$)$_b$-(L$_1$)$_a$-A, wherein r is a positive integer from 2 to 6, g is 0 or a positive integer, s is 0 or a positive integer from 2 to 6, X' is as defined in formula (IIIb), and L$_2$, L$_1$, A, c, b and a are as defined in formula (I);

with R$^6$-W, wherein

R$^6$ is selected from a C$_{1-6}$ alkyl group substituted by a COOH or SO$_3$H group; and W is a leaving group.

In preferred methods of the invention, the leaving group W is selected from Cl, Br, I, OMe, OEt, OH, OTs, OMs, OTf and OC$_6$H$_4$NO$_2$.

Surfactants of formula (I):

A-(L$_1$)$_a$-(CH$_2$)$_b$-(L$_2$)$_c$-X  (I)

wherein

A, L$_1$, a, b, L$_2$ is a linking group and c are as defined in formula (I) and X is

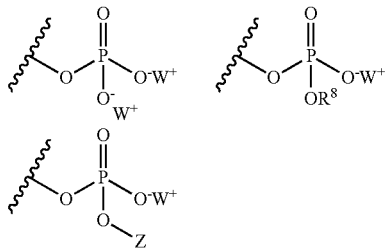

wherein

R$^8$ is selected from H, C$_{1-6}$ alkyl and (CH$_2$CH$_2$O)$_e$R$^x$, wherein R$^x$ is independently H or C$_{1-6}$ alkyl and e is a positive integer from 1 to 100, preferably 5 to 50 and more preferably 10 to 30;

Z is selected from —(CH$_2$)$_r$O(CH$_2$CH$_2$O)$_g$(CH$_2$)$_s$—X-(L$_2$)$_c$-(CH$_2$)$_b$-(L$_1$)$_a$-A and —(CH$_2$)$_t$CH$_u$[(CH$_2$)$_r$O(CH$_2$CH$_2$O)$_g$R$^x$]$_w$[(CH$_2$)$_t$—X-(L$_2$)$_c$-(CH$_2$)$_b$-(L$_1$)$_a$-A]$_y$, wherein r is a positive integer from 2 to 6, t is a positive integer from 1 to 6, u is 0 or 1, w and y is 1 or 2, the sum of u, w and y equals to 3, g is 0 or a positive integer, s is 0 or a positive integer from 2 to 6, R$^x$ is independently H or C$_{1-6}$ alkyl, X is as defined in formula (IVb) and L$_2$, L$_1$, A, c, b and a are as defined in formula (I)

may be prepared by a method comprising reacting a compound of formula (b) A-(L$_1$)$_a$-(CH$_2$)$_b$-(L$_2$)$_c$-OH with POCl$_3$, followed by hydrolysis, wherein A, L$_1$, a, b, L$_2$ is a linking group and c are as defined in formula (I)

and optionally reacting the resulting compound with C$_{1-6}$ alcohol, HO(CH$_2$CH$_2$O)$_e$R$^x$, HO—(CH$_2$)$_r$O(CH$_2$CH$_2$O)$_g$(CH$_2$)$_s$—OH or HO—(CH$_2$)$_t$CH$_u$[(CH$_2$)$_r$O(CH$_2$CH$_2$O)$_g$R$^x$]$_w$—[(CH$_2$)$_t$—OH]$_y$, wherein R$^x$ is independently H or C$_{1-6}$ alkyl, r is a positive integer from 2 to 6, t is a positive integer from 1 to 6, u is 0 or 1, w and y is 1 or 2, the sum of u, w and y equals to 3, s is 0 or a positive integer from 2 to 6 and e and g is a positive integer from 1 to 100, preferably 5 to 50 and more preferably 10 to 30.

The surfactants of the present invention may be incorporated into compositions. Thus, compositions comprising a surfactant as hereinbefore defined form another aspect of the present invention.

Some preferred compositions of the invention further comprise a multicharged compound or polymer. This is preferably the case when the surfactant is of formula (I-I). When the surfactant is of formula (Ia), preferred compositions of the invention do not comprise a multicharged compound or polymer.

When present preferably the multicharged compound or polymer carries the opposite charge to the X group of the surfactant. Thus, when the surfactant has a positively charged X group, preferably the multicharged compound or polymer is negatively charged. When the surfactant has a negatively charged X group, preferably the multicharged compound or polymer is positively charged. Without wishing to be bound by theory it is thought that the multicharged compound or polymer interacts with the charges on more than one surfactant molecule and effectively holds or ties them together in the membrane. Thus, the multicharged compounds or polymers serve to increase the stability of the aqueous droplets, whilst still enabling, e.g. the passage of gas into, and out of, the droplets.

Representative examples of multicharged compounds and polymers with a negative charge include sodium citrate, isocitric acid trisodium salt, sodium tartrate, sodium malonate, poly(sodium 4-styrenesulfonate), polyanetholesulfonic acid sodium salt, poly(acrylic acid), poly(acrylic acid sodium salt).

Representative examples of multicharged compounds and polymers with a positive charge include poly(diallyldimethylammonium chloride), poly(acrylamide-co-diallyldimethylammonium chloride), and poly-L-lysine hydrochloride.

The compounds of formula (I) as hereinbefore defined are for use as surfactants. Thus, in another aspect the present invention relates to the use of a compound having a formula (I) as hereinbefore defined as a surfactant. The surfactants of the invention may be used to stabilise an emulsion, more particularly to stabilise a discontinuous aqueous phase, e.g.

one or more aqueous droplets, in a continuous oil phase, e.g. a continuous oil phase comprising a fluorous oil. The perfluoropolyether component of the surfactants of the present invention acts as a fluorophilic tail, and is soluble in an oil phase, e.g. the continuous oil phase of an emulsion, particularly wherein the oil phase comprises a fluorous oil, e.g. a fluorous oil phase. The hydrophilic head of the surfactants of the invention acts as a ionic headgroup, and is soluble in an aqueous phase, e.g. the discontinuous aqueous phase of an emulsion.

The surfactants of the present invention may be used in the preparation of an emulsion. The present invention thus also relates to the use of a surfactant as hereinbefore described in the preparation of an emulsion.

The present invention also relates to an emulsion comprising a surfactant as hereinbefore described. Preferred emulsions of the present invention comprise a discontinuous aqueous phase, a continuous oil phase and a surfactant as hereinbefore described. The emulsions may comprise aqueous phase, oil phase and surfactants in any amounts suitable to form an emulsion. The skilled man will be readily able to determine such amounts.

Preferably, the continuous oil phase of the emulsions of the invention comprises a fluorous oil. The fluorous oil is preferably a partially fluorinated hydrocarbon, a perfluorocarbon, a hydrofluoroether, or a mixture thereof. Particularly preferably the fluorous oil is a hydrofluoroether. Preferred fluorous oils present in the continuous oil phase of the emulsions of the present invention are Novec™ 7500 (3-ethoxy-1,1,1,2,3,4,4,5,5,6,6,6-dodecafluoro-2-(trifluoromethyl)-hexane), Novec™ 7300 (1,1,1,2,2,3,4,5,5,5-decafluoro-3-methoxy-4-(trifluoromethyl)-pentane), Novec™ 7200 ($C_4F_9OC_2H_5$), Novec™ 7100 ($C_4F_9OCH_3$), Fluorinert™ FC-72, Fluorinert™ FC-84, Fluorinert™ FC-77, Fluorinert™ FC-40, Fluorinert™ FC3283, Fluorinert™ FC-43, Fluorinert™ FC-70, perfluorodecalin and mixtures thereof. More preferred fluorous oils are Novec™ 7500 (3-ethoxy-1,1,1,2,3,4,4,5,5,6,6,6-dodecafluoro-2-(trifluoromethyl)-hexane), Fluorinert™ FC-40, Fluorinert™ FC3283 and perfluorodecalin, and still more preferred is Novec™ 7500 (3-ethoxy-1,1,1,2,3,4,4,5,5,6,6,6-dodecafluoro-2-(trifluoromethyl)-hexane).

In preferred emulsions of the present invention, the discontinuous aqueous phase comprises a plurality of droplets. The droplets preferably have an average diameter of 1 μm to 500 μm, more preferably 10 to 150 μm and still more preferably 30 to 120 μm. This is advantageous because the volume of a droplet is therefore small, and thus the amount of material, e.g. biological material, needed is small. It is preferred that at least some of the droplets comprise one or more analytes. Preferably each droplet comprises an average number of 0 to 100 analytes, more preferably 1 to 20 and still more preferably 1 to 5, e.g. 1 analyte.

In preferred emulsions of the present invention comprising a plurality of droplets, at least some of the droplets further comprise an aqueous and non-aqueous phase, a chemical buffer, a biochemical buffer or a culture or other media. Examples of suitable chemical buffers include ammonium bicarbonate, ammonium acetate and phosphate-buffered saline (PBS). Examples of suitable biochemical buffers include HEPES, PBS and Trizma.

In emulsions of the invention comprising a plurality of droplets wherein at least some of the droplets comprise one or more analytes, the analyte may be any entity of interest. In one group of emulsions of the invention comprising a plurality of droplets wherein at least some of the droplets comprise one or more analytes, the analytes are preferably biological molecules selected from small molecules, amino acids, peptides, proteins, antibodies, enzymes, monosaccharides, disaccharides, oligosaccharides, polysaccharides, nucleic acids, oligonucleotides, nucleotides, metabolites, cofactors and artificially engineered molecules. More preferably the biological molecules are selected from antibodies, enzymes, oligonucleotides and metabolites and still more preferably from antibodies and metabolites. Optionally the biological molecules may be contained in cells (e.g. mammalian cells, plant cells, algal cells, yeast cells, hybridomas, microorganisms), cell organelles (e.g. cell nuclei, mitochondria), viruses or prions.

In another group of emulsions of the invention comprising a plurality of droplets wherein at least some of the droplets comprise one or more analytes, the analytes are biological analytes, e.g. cells, sub-cellular complexes of cellular building blocks or components. The biological analytes are preferably selected from cells (e.g. mammalian cells, plant cells, algal cells, microbial cells, yeast cells), primary B-cells, T-cells, hybridomas, microorganisms, viruses, bacteria, or prions, cell organelles (e.g. cell nuclei, mitochondria) or exosomes, more preferably from B-cells, T-cells, hybridomas and microorganisms, and still more preferably from hybridomas and microorganisms. When the biological analyte is a cell, the cell is preferably selected from mammalian cells, plant cells, algal cells, microbial cells, more preferably from mammalian cells and microbial cells and still more preferably from mammalian cells. Preferably molecules are produced in, excreted or secreted from the cells, e.g. molecules are excreted or secreted from the cells. When the biological analyte is a cell organelle, the cell organelle is preferably selected from cell nuclei and mitochondria.

In a further group of emulsions of the invention comprising a plurality of droplets wherein at least some of the droplets comprise one or more analytes, the analytes are assay components which are preferably selected from beads, nanoparticles, crystals, micelles, quantum dots, detection reagents, antibodies, enzyme co-factors, nucleic acid amplification reagents, oligonucleotide sequencing reagents, cell transformation reagents, cell transduction mixtures and genome editing reagents. More preferably the assay components are selected from beads, detection reagents, nucleic acid amplification reagents and genome editing reagents, still more preferably detection reagents.

When at least some of the droplets contain a living entity, e.g. cell or bacterium, the aqueous phase preferably comprises a culture or growth medium. Any conventional medium may be used. The medium may, for example, comprise glucose, vitamins, amino acids, proteins, salts, pH indicators and density matching reagents, e.g. Ficoll. Sufficient medium must be provided to keep the entity alive for the duration of the analysis, reaction or other process of interest, e.g. sorting in a microfluidic device.

The present invention also relates to a method of preparing an emulsion as hereinbefore described, comprising:
 (i) preparing an aqueous phase;
 (ii) preparing an oil phase; and
 (iii) mixing the aqueous phase, the oil phase and a surfactant as hereinbefore described to form the emulsion.

In one group of preferred methods of preparing an emulsion the surfactant is mixed with (e.g. dissolved in) the oil phase prior to mixing with said aqueous phase. Preferably, the surfactant is dissolved in the oil phase at a concentration of 0.001% (w/w) to 20% (w/w), more preferably 0.1% (w/w) to 10% (w/w) and still more preferably 0.5% (w/w) to 5% (w/w). Preferably, the aqueous phase comprises at least one analyte. In some preferred methods the oil phase may be a solution of the surfactant in a fluorous solvent. In other words, the surfactant may be dissolved in a fluorous solvent to give the oil phase.

In alternative preferred methods of preparing an emulsion the surfactant is mixed with (e.g. dissolved in) the aqueous phase prior to mixing with the oil phase.

In further preferred methods of preparing an emulsion the surfactant is mixed with (e.g. dissolved in) the aqueous phase and is separately mixed with (e.g. dissolved in) the oil phase prior to mixing of the aqueous phase with the oil phase. Any conventional mixing method may be used, e.g. T-junction, step emulsification, flow focus junction etc.

In preferred methods of preparing an emulsion as hereinbefore described the mixing is by a flow focus junction of a microfluidic device, e.g. a microfluidic device as disclosed in WO2012/022976 and WO2015/015199. This is advantageous because it enables very small aqueous phases, e.g. microdroplets, to be produced, with volumes typically in the order of picolitres or nanoliters.

Further preferred features of the method of preparing an emulsion are the same as the preferred features of the emulsion described above. Thus preferably the emulsion, the aqueous phase and the oil phase are as defined above in relation to the emulsion.

Experiments, assays, reactions and processes may be carried out in the emulsions of the present invention. The discontinuous aqueous phase of the emulsion, e.g. aqueous droplets, may serve as the site for the experiments, assays, reactions and processes. The surfactants of the present invention stabilise the emulsion, e.g. a discontinuous aqueous phase in an oil phase, allowing the experiment, assay, reaction or process to be carried out in the emulsion. The experiment, assay, reaction or process may therefore be carried out without the discontinuous aqueous phase, e.g. aqueous droplets, coalescing. The experiment, assay, reaction or process may involve one or more analytes present in the aqueous phase of the emulsion. Thus a method of performing one or more experiments, assays, reactions and processes within an emulsion, e.g. within the discontinuous aqueous phase (preferably aqueous droplets) of an emulsion as hereinbefore described forms another aspect of the present invention. The experiments, assays, reactions and processes carried out in the emulsions of the present invention may be carried out in a microfluidic channel or in a microfluidic device, e.g. the experiments, assays, reactions and processes may be carried out in one or more channels of a microfluidic device.

The present invention thus also relates to a method of performing one or more chemical and/or biological reactions, and/or biological processes in the discontinuous aqueous phase of an emulsion as hereinbefore described.

In one aspect the method of performing one or more chemical and/or biological reactions, and/or biological processes in the discontinuous aqueous phase of an emulsion as hereinbefore described is preferably a method of performing one or more chemical and/or biological reactions. The chemical and/or biological reaction may be an enzymatic reaction. Alternatively, the chemical and/or biological reaction is a molecular binding, molecular interaction, cellular interaction or conformational change resulting in a measurable signal. Preferably the chemical and/or biological reaction is an enzyme reaction, a molecular binding or a molecular/cellular interaction.

In another aspect the method of performing one or more chemical and/or biological reactions, and/or biological processes in the discontinuous aqueous phase of an emulsion as hereinbefore described is preferably a method of performing one or more biological processes. The biological process may be antibody secretion or enzyme secretion by cells, or enzyme production inside cells. Alternatively, the biological process is antibody binding. In alternative methods the biological process may be a nucleic acid amplification process, partial or full nucleic acid replication process or nucleic acid transcription process. Alternatively, the biological process may be cell proliferation, cell metabolism, cell transfection, cell transduction, cell signalling, cell apoptosis or cell death. Preferably the biological process is PCR. The process used could be for digital PCR.

The present invention thus also relates to a method of performing one or more drug screening tests against cells, molecules or cell constituents in the discontinuous aqueous phase of an emulsion as hereinbefore described.

In another aspect of the method of performing one or more biological processes the biological process may be a genome editing process. The biological process may be sample preparation, e.g. oligonucleotide sample preparation process for sequencing. The biological process may be nucleic acid sequencing. The molecules being sequenced could be RNA or DNA and the sequencing could be at the genomic, epigenomic or transcriptomic level.

The method of performing one or more chemical and/or biological reactions, and/or biological processes in the discontinuous aqueous phase of an emulsion as hereinbefore described may comprise one or more chemical reactions, one or more biological reactions, one or more biological processes or a mixture thereof. Preferred chemical and/or biological reactions, and/or biological processes are as described above.

Preferably, the method of performing one or more chemical and/or biological reactions, and/or biological processes in the discontinuous aqueous phase of an emulsion as hereinbefore described is carried out in a microfluidic channel or microfluidic device. This enables chemical and/or biological reactions and/or biological processes to be performed on a very small scale, e.g. in microdroplets, and so very little material, e.g. biological material, is required. The microfluidic channel or device is preferably controlled by an automated device and software.

Preferably, the method of performing one or more chemical and/or biological reactions, and/or biological processes in the discontinuous aqueous phase of an emulsion as hereinbefore described is carried out under thermal, pH or environmental cycling conditions.

The surfactants and emulsions of the present invention have many useful applications. They particularly have many potential uses in microfluidics applications. For example, the surfactants and/or emulsions hereinbefore defined may be used in methods of sorting droplets, coalescing droplets or introducing fluid into a droplet. The surfactants and/or emulsions may also be used in methods of extracting a protein from a fluid. These methods are preferably carried in a microfluidic device.

The methods of the invention described herein (e.g. method of preparing an emulsion, method comprising performing one or more chemical and/or biological reactions, and/or biological processes in the discontinuous phase of an emulsion, method for sorting droplets in a microfluidic device, method of coalescing droplets in a microfluidic device, method of introducing a fluid into a droplet in a microfluidic device, method of splitting droplets in a microfluidic device, method of extracting a molecule from a fluid) may be carried out simultaneously or sequentially (e.g.

sequentially) in any combination and order. The carrying out of two or more methods of the invention may be known as a workflow of functions.

A preferred workflow of functions comprises the steps of:
(i) preparing an emulsion as hereinbefore defined, comprising a) preparing an aqueous phase, b) preparing an oil phase, and c) mixing said aqueous phase, said oil phase and a surfactant as hereinbefore defined to form said emulsion in a microfluidic device, wherein the aqueous phase contains cells (e.g. mammalian cells, plant cells, algal cells, yeast cells, hybridomas, microorganisms), cell organelles (e.g. cell nuclei, mitochondria), viruses, or prions in a biological media; the oil phase consists of a fluorous solvents as hereinbefore defined and a surfactant as hereinbefore defined; the resultant emulsion comprises a plurality of droplets, and each droplet contains maximum one cell (e.g. mammalian cells, plant cells, algal cells, yeast cells, hybridomas, microorganisms), cell organelle (e.g. cell nuclei, mitochondria), virus, or prion;
(ii) performing a first biological process as hereinbefore defined inside the said droplets from step (i), wherein the biological processes are cell proliferation, antibody production by cells, antibody secretion by cells, genome editing of cells, enzyme secretion by cells, enzyme production in cells and enzyme reaction;
(iii) sorting droplets as hereinbefore defined in a microfluidic device, comprising a) providing a stream of said aqueous droplets from step (ii) in an emulsion as hereinbefore defined in a channel of the microfluidic device; illuminating the stream from a first direction; detecting light from analytes within the droplets in a second direction, wherein detecting light is a scattered light or a fluorescence from analytes; sorting the droplets into one of a plurality of differentiated streams responsive to the detected light or a measurable signal;
(iv) optionally introducing a fluid into the said sorted droplets from step (iii) as hereinbefore defined in a microfluidic device, wherein the fluid comprises at least one biological molecule, wherein the biological molecule is selected from small molecules, proteins, enzymes, peptides, amino acids, polysaccharides, oligosaccharides, disaccharides, monosaccharides, nucleic acids, oligonucleotides, nucleotides, cofactors, and cell lysing reagents;
(v) optionally performing a second biological process as hereinbefore defined inside the said droplets from step (iv), wherein the said biological processes are cell lysis and an enzyme reaction, wherein the said enzyme is secreted by the said cell or produced inside the said cell in step (ii), and the said enzyme reaction is to convert a said biological molecule in step (iv) into its corresponding products;
(vi) optionally quenching the said enzyme reaction in step (v) by a) treating the said droplets from step (v) at an elevated temperature for a certain period of time, wherein the temperature is from 50° C. to 98° C., and the period of time is from 10 seconds to 1 hour; b) introducing a fluid into the said droplets from step (v) as hereinbefore defined in a microfluidic device, wherein the fluid comprises an acid, an alkaline, or an enzyme inhibitor; c) storing the said droplets from step (v) at a temperature from 4° C. to 10° C.;
(vii) splitting droplets from step (iii) or (vi) as hereinbefore defined in a microfluidic device comprising a) providing droplets from step (iii) or (vi) in a first microfluidic channel of a microfluidic junctions comprising three microfluidic channels on the microfluidic device; and passing the aqueous droplet through the microfluidic junction, thereby splitting the said droplet into two daughter droplets, the first daughter droplet in the second microfluidic channel and the second daughter droplet in the third microfluidic channel;
(viii) analysing the product molecule produced from the said enzyme reaction in step (iii) or (v) inside the first daughter droplet using mass spectrometry (MS) method after evaporating and ionizing the contents of the first daughter droplet via a microfluidic electrospray ionization (i.e. ESI) emitter;
(ix) sorting the corresponding second daughter droplet in a microfluidic device responsive to MS analysis results in step (viii).

BRIEF DESCRIPTION OF FIGURES

These and other aspects of the invention will now be further described, by way of example only, with reference to the accompanying figures in which.

EXAMPLES

Figure 1:
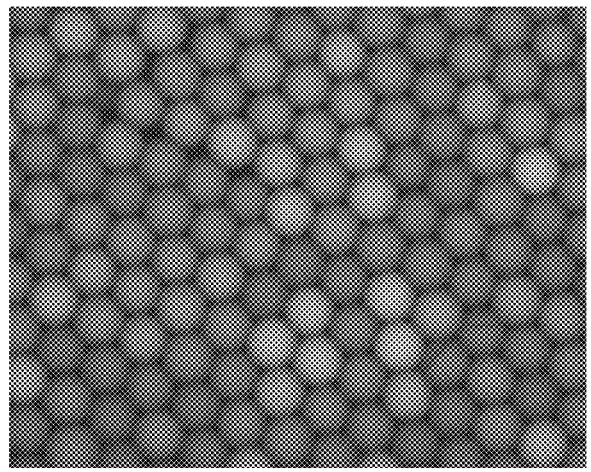
FIG. 1 shows a fluorescence microscopy image of a control emulsion comprising the non-ionic surfactant Pico-Surf™.

All starting materials and solvents used were commercially available.

1. Synthesis of N-(4-[1-carboxymethylpyridin-1-ium inner salt]methyl) Krytox amide (4)

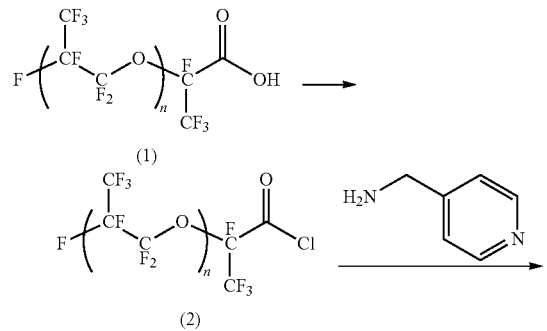

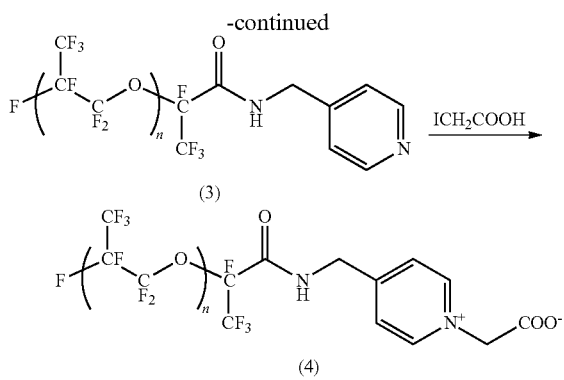

Synthesis of Krytox Acyl Chloride (2)

In a 1 litre round bottom flask fitted with a magnetic stirrer bar and a 50 mL dropping funnel fitted with a septum, 385.76 grams (172.8 mmol) of Krytox 157 FS(L)(1) was degassed by applying vacuum and replaced with nitrogen three times. Dry Novec 7100 (stored over anhydrous $Na_2SO_4$, 320 mL) was injected with a syringe into the dropping funnel and emptied into the flask in 50 mL aliquots. Once all Krytox was dissolved up into a homogenous solution, 45 mL of oxalyl chloride (524.7 mmol) was syringed into the dropping funnel and slowly added over 10 minutes. Finally, 100 µL of anhydrous DMF was added by syringe directly into the reaction mixture. The resultant mixture was stirred at room temperature overnight, decanted into a clean 1 litre round bottom flask, concentrated at 40° C. and 270 mbar on a rotary-evaporator, and further dried on at 50° C. at 0-5 mbar for 30 minutes yielding krytox acyl chloride (2) as a clear oil (387.44 grams, 99.6%). IR ($cm^{-1}$): 1808 (sm).

Synthesis of N-(4-Pyridiniummethyl) Krytox amide (3)

To a stirred solution of 4-(aminomethyl)pyridine (21.475 g, 20.11 mL, 198.6 mmol) in anhydrous THF (30 mL), at 50° C. under nitrogen, was added solution of krytox acid chloride (2, 66.11 g, 28,37 mmol) in Novel 7500 (70 mL) dropwise from a dropping funnel. Then stirred at 50° C. under nitrogen for 48 hours and cooled to RT. The reaction was filtered to remove a dark red coloured solid and washed with a little Novec 7500 (25 mL). The filtrate was stirred with methanol (75 ml) and then the the two phases were separated and the bottom fluorous layer was collected. The fluorous layer was then washed with methanol (3×50 mL) each time retaining the bottom fluorous layer. The fluorous layer was then evaporated to dryness in vacuo to yield (3) as a pale yellow oil (58.70 g, 86.1%). IR ($cm^{-1}$): 1709.5 (sm). $^1$H NMR (400 MHz, 5% $C_6D_{12}$ in FC72;vol:vol): 9.90 (1H, bs, NH), 8.194 (2H, d, pyridyl-Ha), 7.018 (2H, bs, pyridyl-Hb), 4.51 (1H, bd, benzylic $CH_2$), 4.395 (1H, bd, benzylic $CH_2$).

Synthesis of N-(4[1-carboxymethylpyridin-1-ium inner salt]methyl) Krytox amide (4)

The pale yellow oil of N-(4-Pyridiniummethyl) Krytox amide (3, 11.074 g, 4.609 mmol) was dissolved in Novec™ 7500 (25.0 mL), and warmed to 35° C. On addition of the solution of iodoacetic acid (1.071 g, 5.671 mmol) and Hunig's base (1.054 mL, 6.049 mmol) in THF, the solution went from yellow to pale green. The reaction temperature was ramped up to 65° C., and maintained at this temperature overnight. The reaction mixture was concentrated in vacuo to remove THF, and the remaining washed with a mixture of methanol (30 mL) and DCM (30 mL). The bottom layer was separated off, washed with 15% methanol/DCM (30 mL) 6 times followed with pure DCM (40 mL) 2 times, and dried in vacuo to give dark oil (4, 8.929 g, 78.7%). IR ($cm^{-1}$): 1731.4.). $^1$H NMR (400 MHz, 5% $C_6D_{12}$ in FC72;vol:vol): 9.406 (1H, bs, NH), 8.253 (2H, bs, pyridyl-Ha), 7.054 (2H, bs, pyridyl-Ha), 5.0-4.0 (4H, bd, benzylic $CH_2$ and $CH_2$ of inner salt).

2. Synthesis of N-(4-[1-(y-methoxy PEG-pyridin-1-ium bromide]methyl) Krytox amide (5)

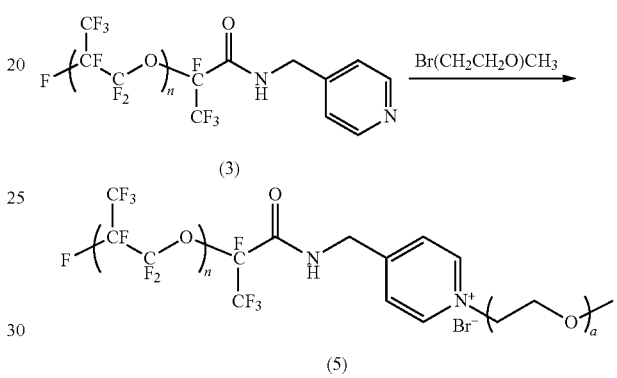

To a stirred solution of O-[1-bromo-2-ethyl]-O'-methyl-polyethylene glycol (3.767 g, 4.442 mmol) in THF under nitrogen at heating block temperature of 60° C., was added a solution of N-(4-Pyridiniummethyl) Krytox amide (3, 9.606 g, 3.998 mmol) in Novec™ 7500 (30 mL) from a dropping funnel dropwise over 30 minutes. The reaction temperature was ramped up to 80° C., and maintained at this temperature for 2 days. The reaction mixture was concentrated in vacuo to remove THF, and the remaining washed with a mixture of methanol (25 mL). The bottom layer was separated off, washed with methanol (25 mL) 6 times, and dried in vacuo to give dark oil (5, 5.595 g). IR ($cm^{-1}$): 1716.5. $^1$H NMR (400 MHz, 5% $C_6D_{12}$ in FC72;vol:vol): 10.366 (1H, bs, NH), 9.296 (2H, bs, pyridyl Ha), 8.103 (2H, bs, pyridyl Ha), 4.295 (2H, bs, pyridyl N4-$CH_2$), 4.093 (2H, bm, benzylic $CH_2$), 3.53 (31.0H, $CH_2$—($OCH_2CH_2$)$_{6.5}$OMe).

3. Synthesis of N-[3-(Trimethylammonium iodide)propyl] Krytox amide (7)

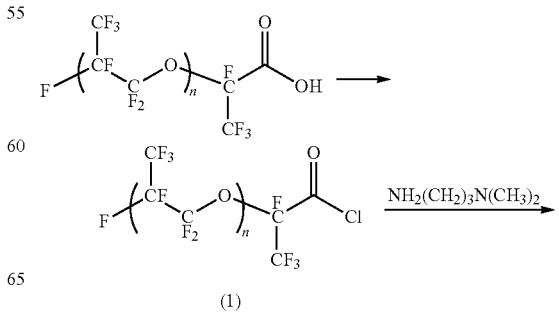

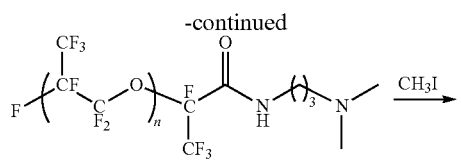

(6)

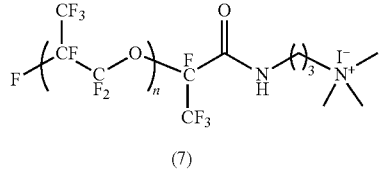

(7)

Synthesis of N-[3-(Dimethylamino)propyl] Krytox amide (6)

To a stirred solution of 3-(dimethylamino)-1-propylamine (50.61 g, 62.3 mL, 495 mmol) in anhydrous THF (60 mL),), at 50° C. under nitrogen, was added a solution of krytox acid chloride (2, 192.39 g, 82.55 mmol) in Novec 7500 (203 mL) dropwise over 1 H, via canula. After stirring the mixture at 50° C. under nitrogen for 48 hours the mixture was cooled to RT and a yellow solid removed by filtration and washed with Novec 7500 (30 ml). The filtrate was stirred with methanol (4×100 mL), each time the bottom flourous phase was separated in a separating funnel. The fluorous layer was then evaporated to dryness in vacuo to yield (6) as a pale yellow oil (189.7 g, 95.9%). IR (cm$^{-1}$): 2955.5 (bw), 2832.0 (bw), 1729.6 (sm). $^1$H NMR (400 MHz, 5% C$_6$D$_{12}$ in FC72;vol:vol): 9.506 (1H, bs, NH), 3.493(2H, m, CONHCH$_2$), 2.488 (2H, t, CH$_2$—NMe$_2$), 2.246 (6H, s, NMe$_2$), 1.692 (2H, m, CH$_2$—CH$_2$NMe$_2$).

Synthesis of N-[3-(Trimethylammonium iodide)propyl] Krytox amide (7)

To a stirred solution of N-[3-(Dimethylamino)propyl] Krytox amide (6, 8.05 g, 3.36 mmol) in Novec 7100 (16.0 mL) and anhydrous acetonitrile, at 40° C. under nitrogen, was added methyl iodide (0.42 mL, 6.72 mmol) via syringe. Immediately the solution went clear, then block temperature was raised to 50° C. and stirred for 60 H. After cooling the solution to RT the solution was evaporated to dryness to thick pale yellow oil (8.73 g, 98.2%). IR (cm$^{-1}$): 1705.2 cm-$^1$. $^1$H NMR (400 MHz, 5% C$_6$D$_{12}$ in FC72;vol:vol): 9.575 (1H, bs, NH), 3.667 (4H, bs, CH$_2$—N+Me$_3$ and NH—CH$_2$), 3.349 (9H, bs, N$^+$Me$_3$).

4. Synthesis of N-[3-Dimethyl-3-carboxymethyl ammonium inner salt)propyl] Krytox amide (8)

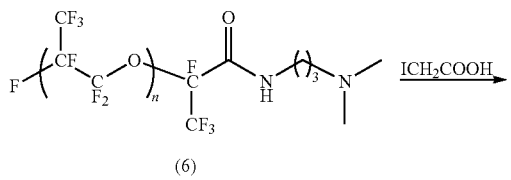

(6)

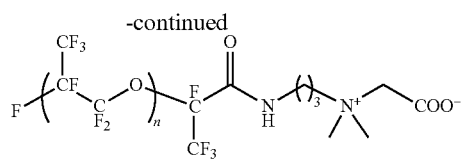

(8)

To a stirred solution of N-[3-(Dimethylamino)propyl] Krytox amide (6, 12.74 g, 5.32 mmol) in Novec 7100 (25.0 mL), at RT under nitrogen, was added a solution of iodo-acetic acid (1.44g, 7.72 mmol) in anhydrous THF (20.0 mL, plus 5.0 ml wash) to which had been added Hunig's base (1.39 mL, 7.98 mmol) via syringe. Then raise the block temperature to 35° C. After 20 H the reaction was cooled to RT and filtered and the filtrate evaporated to dryness. The resultin oil was dissolved in Novec 7500 (25 mL) and washed with methanol (3×25 mL) each time carefully separating off the lower fluorous layer. The resulting fluorous layer was evaporated to dryness in vacuo to give (8, 11.54 g, 88.4%). IR (cm$^{-1}$): 1754.7 (w), 1709.7 (m). 1623.2 (m). $^1$H NMR (400 MHz, 5% C$_6$D$_{12}$ in FC72;vol:vol): 10.169 (1H, s, NH), 5.0-3.0 (6H, bm, NHCH$_2$, CH$_2$—N+Me2 and CH$_2$—CO$_2^-$), 2.342 (2H, bs, CH$_2$—CH$_2$—CH$_2$).

5. Synthesis of N-[3-Dimethyl-3-y-methoxy-PEG ammonium iodide)propyl] Krytox amide (9)

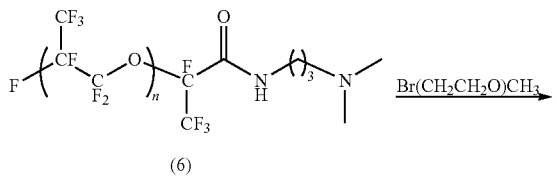

(6)

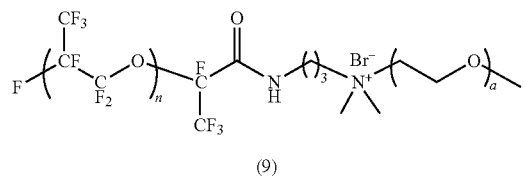

(9)

To a stirred solution of N-[3-(Dimethylamino)propyl] Krytox amide (6, 3.92 g, 1.64 mmol) in Novec 7100 (8.0 mL), at RT under nitrogen, was added a solution of O-[1-bromo-2-ethyl]-O'-methyl-polyethylene glycol (2.79 g, 2.45 mmol) in anhydrous acetonitrile (8.0 mL, plus 1.5 mL wash) and the block temperature set to 50° C. After 60 H the reaction was cooled to RT and the top layer was carefully removed with a Pasteur pipette. The solution was evaporated to dryness and redissolved in Novec 7500 (10 mL) and was stirred with methanol (2×15 mL). Each time the two layers were separated and the bottom fluorous layer was washed with methanol. The resulting fluorous layer was evaporated to dryness in vacuo to give (9, 3.32 g, 58.9%) as an orange oil. IR (cm$^{-1}$): 1693.4.

6. Synthesis of N-[3-Dimethyl-3-(1-hydroxypropyl) ammonium iodide)propyl] Krytox amide (10)

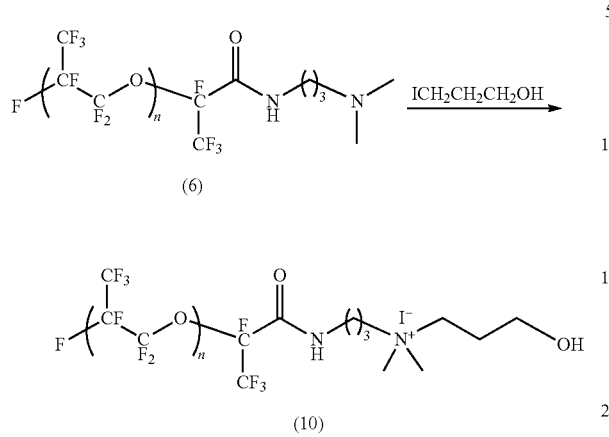

To a solution of N-[3-(Dimethylamino)propyl] Krytox amide (6, 10.425 g, 4.351 mmol) in Novec 7100 (12.0 mL) and THF (12.0 mL), was added a solution of 3-iodo-1-propanol (1 g, 5.376 mmol) in THF (6.0 mL). The dark brown solution went lighter on addition and was stirred overnight under nitrogen with the heating block temperature set to 35° C. The reaction mixture was evaporated to dryness, the residue re-dissolved in Novec™ 7500 (25 mL) and methanol (25 mL), and the solution stirred on a rotary evaporator at 50° C. for 5 minutes. This was repeated for another 3 times, and evaporated to dryness (10, 7.141 g, 66.86%) as an orange oil orange oil. IR (cm$^{-1}$): 1712.3. $^1$H NMR (400 MHz, 5% $C_6D_{12}$ in FC72;vol:vol): 10.404 (1H, bs, NH, 4.0-3.7 (4H, bs, NHCH$_2$ and CH$_2$O), 3.7-3.1 (10H, bs, —CH$_2$N+Me$_2$CH$_2$), 2.5-2.0 (4H, bs, CH$_2$CH$_2$CH$_2$NMe$_2$$^+$CH$_2$CH$_2$CH$_2$OH), 1.694 (1H, bs, OH).

7. Synthesis of Ammonium Salt of Krytox (11)

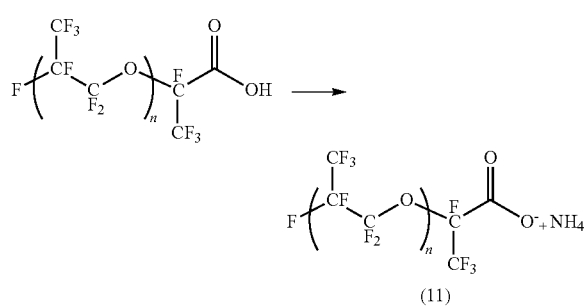

Krytox (50.00 grams, 21.63 mmol) was placed in a 250 mL round bottom flask fitted with magnetic stirrer bar and septum. The flask was degassed by applying vacuum and refilled with nitrogen 3 times. Novec 7100 (70 mL) was added by syringe to dissolve Krytox, followed by 7 molar ammonia in methanol (20 mL) by syringe. The reaction was stirred at room temperature for three days. The solvent was evaporated under vacuum to leave an amber coloured waxy residue of (11).

8. Synthesis of Quaternary Ammonium Salt (13)

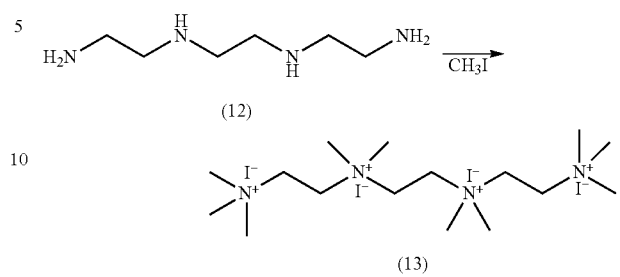

Anhydrous tetrahydrofuran (15 mL) was placed in a 20 mL vial and fitted with a stirrer bar. Triethylenetetramine (12, 0.989 g, 6.76 mmol) was added, followed by iodomethane (4.00 g, 28.18 mmol) at room temperature, upon which a precipitate formed. The reaction was stirred for 3 hours at room temperature and then evaporated to dryness to give quaternary ammonium salt (13).

9. Synthesis of Quaternary Ammonium Salt (15)

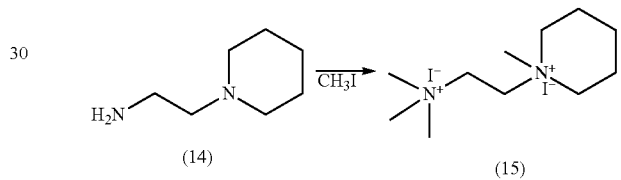

Anhydrous tetrahydrofuran (15 mL) was placed in a 20 mL vial and fitted with a stirrer bar. 1-(2-Aminoethyl) piperidine (1.770 g, 13.81 mmol) was added, followed by iodomethane (4.00 g, 28.18 mmol) at room temperature, upon which a precipitate formed. The reaction was stirred for 3 hours at room temperature and then evaporated to dryness to give quaternary ammonium salt (15).

10. Synthesis of Quaternary Ammonium Salt (17)

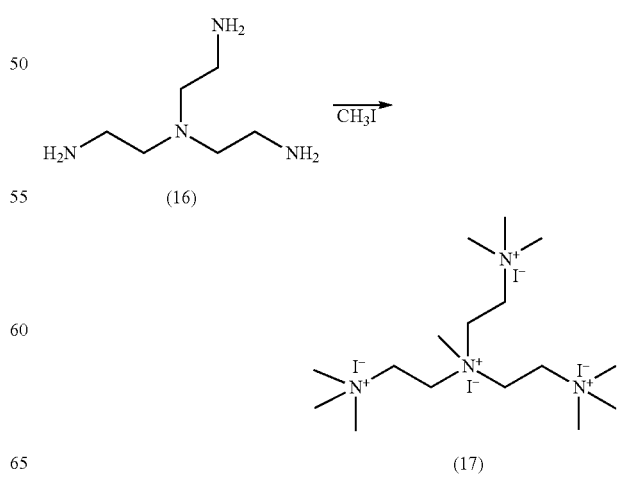

Anhydrous tetrahydrofuran (15 mL) was placed in a 20 mL vial and fitted with a stirrer bar. Tris(2-aminoethyl)amine (0.989 g, 6.76 mmol) was added, followed by iodomethane (4.00 g, 28.18 mmol) at room temperature, upon which a precipitate formed. The reaction was stirred for 3 hours at room temperature and then evaporated to dryness to give quaternary ammonium salt (17).

11. Proposed Synthesis of Cationic Triblock Surfactant (18)

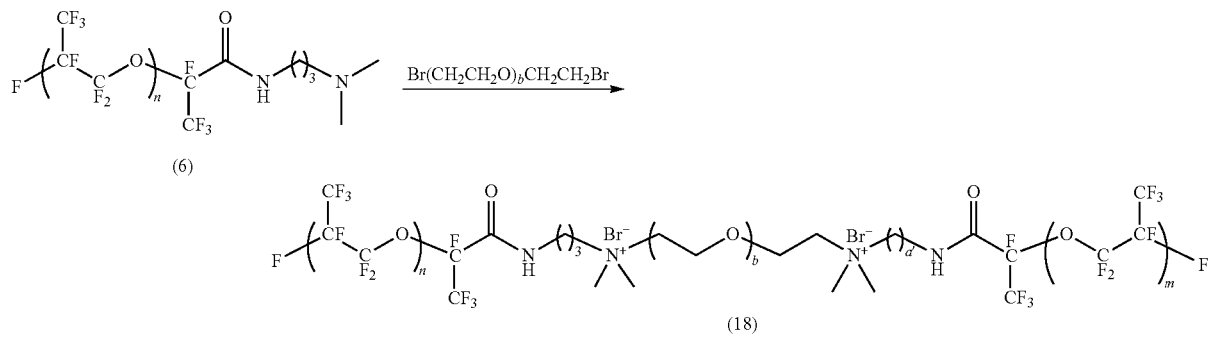

12. Proposed Synthesis of Zwitterionic Diblock Polymeric Surfactant (23), (24) and (25)

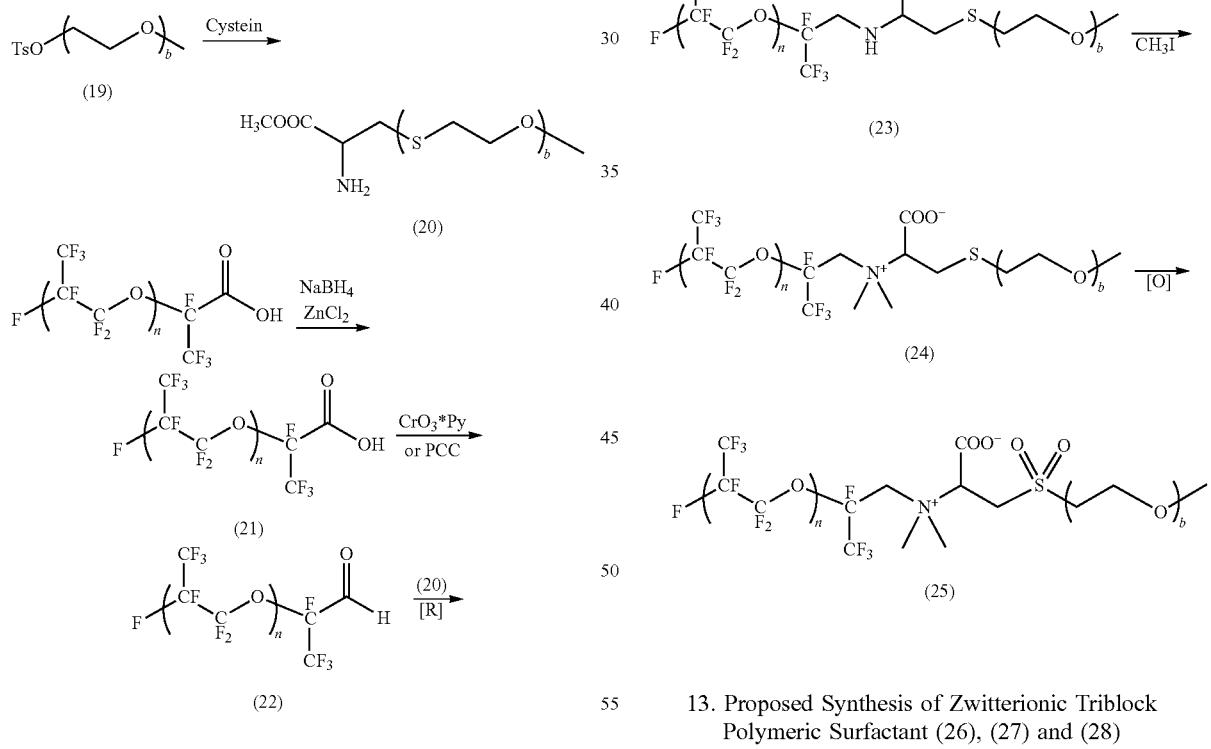

13. Proposed Synthesis of Zwitterionic Triblock Polymeric Surfactant (26), (27) and (28)

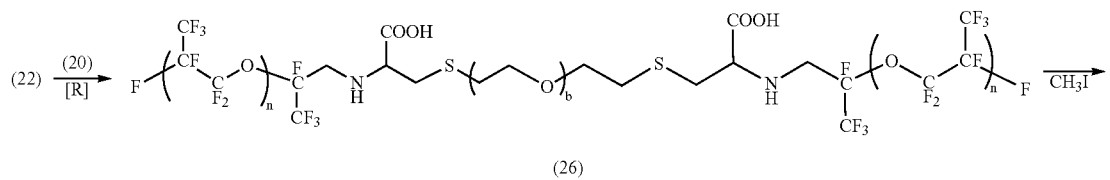

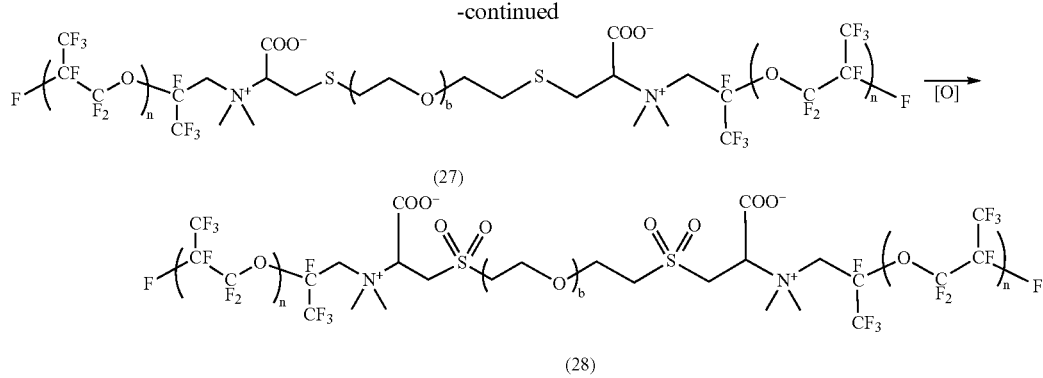
(27)
(28)
14. Proposed Synthesis of Anionic Surfactant (29) and (30)
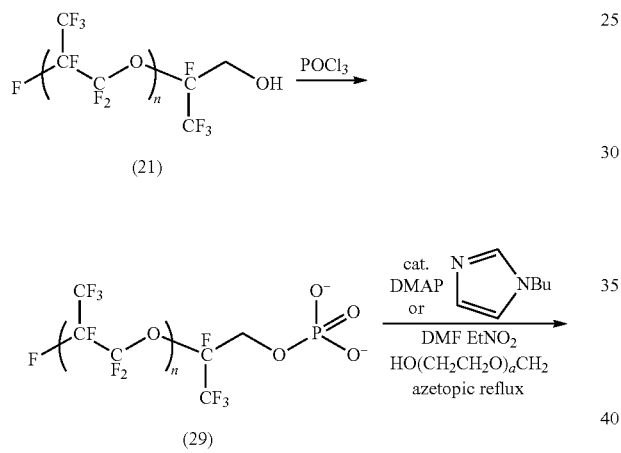
(21)
(29)
(30)
15. Proposed Synthesis of Anionic Triblock Polymeric Surfactant (31)
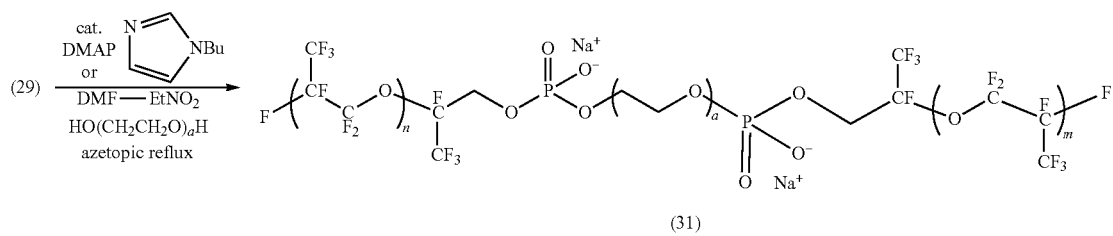
(31)

16. Proposed Synthesis of Anionic 3-Armed Star Polymeric Surfactant (35)
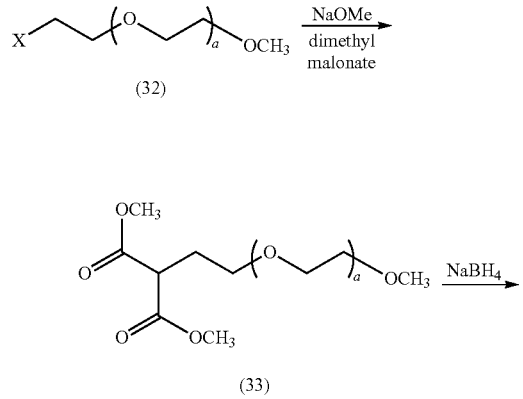
(32)
(33)
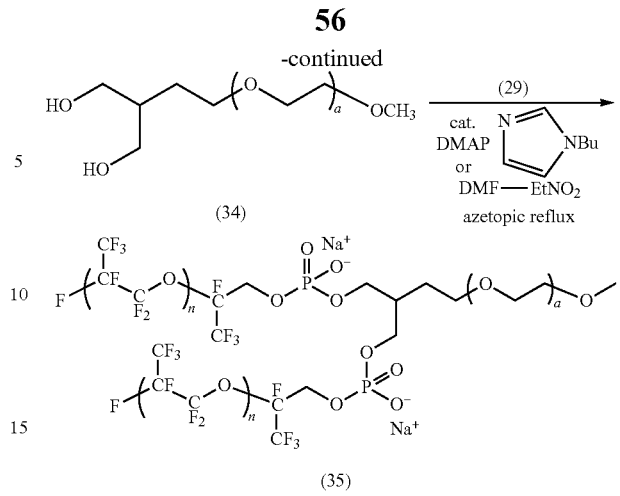
(34)
(35)
17. Proposed Synthesis of Anionic 4-Armed Star Polymeric Surfactant (38)
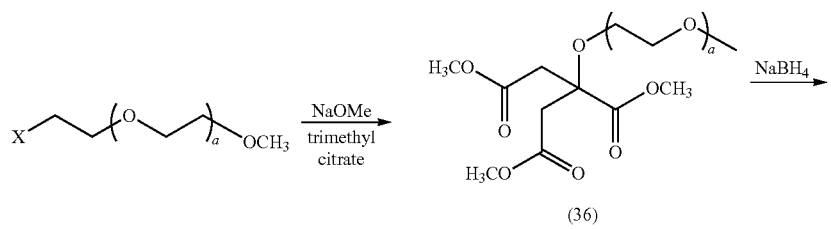
(36)
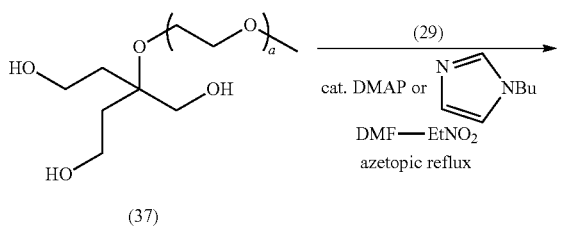
(37)
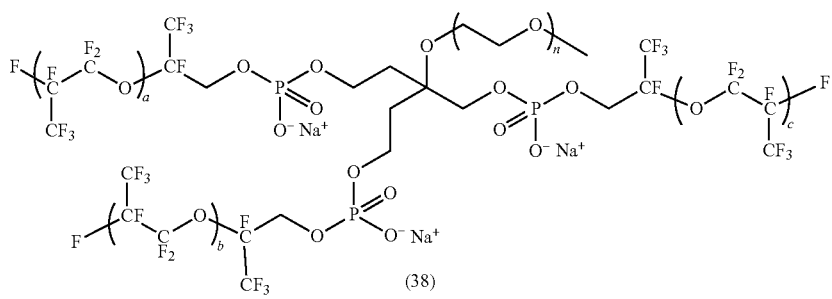
(38)

18. Droplet Generation

In order to generate droplets with volumes between 300-400 pL, fluorous oil containing 0.5% (w/w) of one of the surfactants of the invention was used as the continuous carrier oil phase, whilst a PBS solution with various additives was used as the dispersed aqueous phase. The two phases were infused using a Cetoni GmbH syringe pump connected via polythene tubing (ID: 0.38 mm) to a PDMS microfluidic chip, containing a single flow-focusing nozzle (nozzle dimensions: 60×60 μm). Typical flow rates ranged between 1700-2500 μL/hr for the fluorous phases and were kept constant at 600 μL/hr for aqueous phases. Droplets were collected for 6 minutes in each case, generating ~60 μL of emulsion.

19. Resorufin Leakage Test

To investigate the ability of the surfactants of the present invention to circumvent the issue of inter-droplet molecular exchange, Resuorufin (sodium salt; 10 μM) was added to the aqueous phase, and droplets were generated as described in step 18. The positive emulsions (with Resorufin) were carefully pipetted into an Eppendorf tube containing the corresponding negative emulsions (without Resorufin). The tube was rotated slowly in order to fully mix the emulsions, and left to stand at room temperature overnight. The droplets were then imaged using fluorescence microscopy. Control emulsion samples were also made using phosphate buffered saline (PBS) without additives and a non-ionic surfactant Pico-Surf™ (Sphere Fluidics Limited).

The results for the comparative emulsion are shown in FIG. 1 wherein the droplets are uniformly bright indicating resorufin leakage and equilibration across the droplets.

Figure 2:
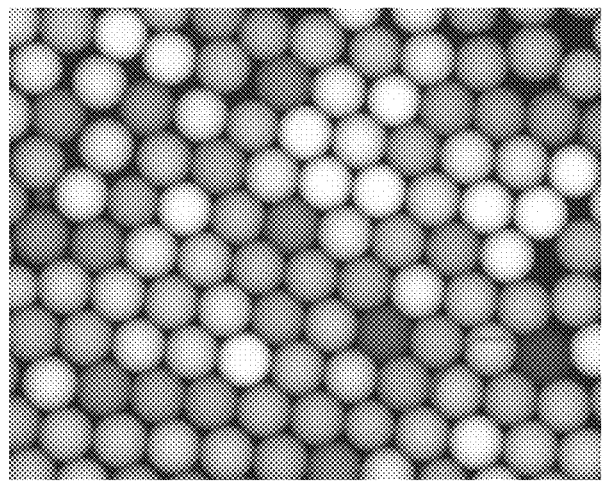
FIG. 2 shows a fluorescence microscopy image of an emulsion comprising a zwitterionic surfactant of the present invention.
Figure 3:
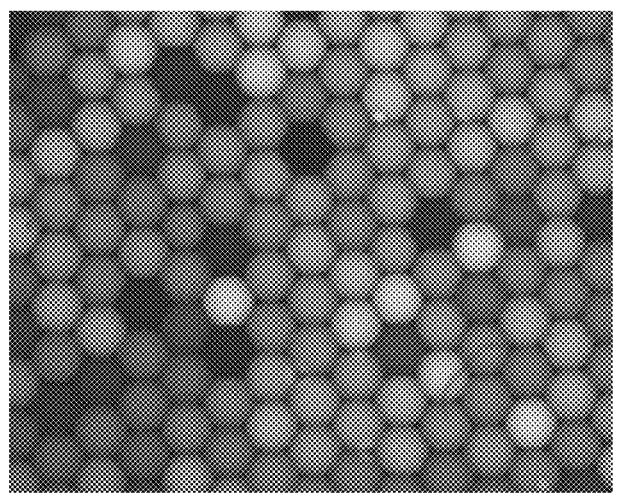
FIG. 3 shows a fluorescence microscopy image of an emulsion comprising a zwitterionic surfactant of the present invention.

The results for zwitterionic surfactants (4 and 8) are shown in FIGS. 2 and 3. The for zwitterionic surfactants (4 and 8) showed the capability to stabilize the emulsion of PBS as the aqueous phase, and reduced inter-droplet molecular exchange of resorufin compared to the control emulsion sample stabilized by Pico-Surf™, as shown by fluorescent microscopy that Image 2 of emulsion stabilized by zwitterionic surfactant 4 and Image 3 of emulsion stabilized by zwitterionic surfactant 8.

Figure 4:
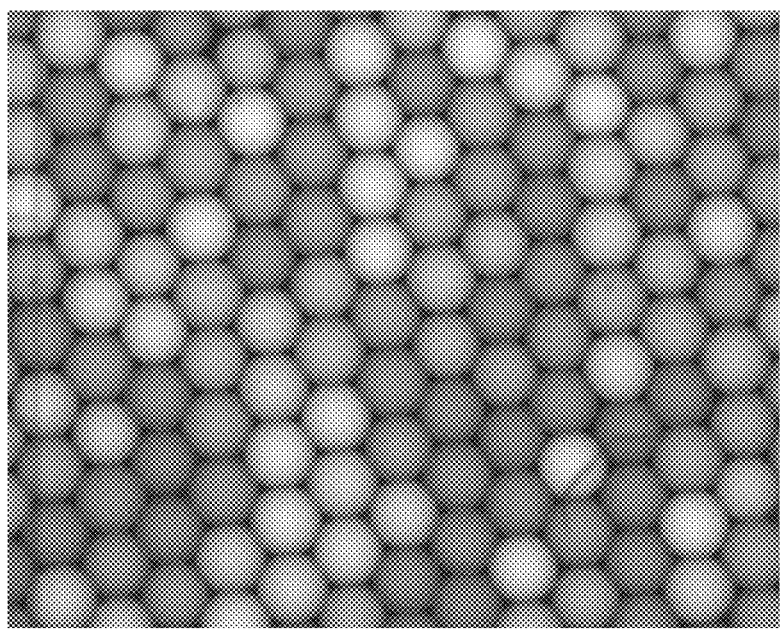
FIG. 4 shows a fluorescence microscopy image of a control emulsion comprising the polyanionic additive PSS (0.5%) in addition to the non-ionic surfactant Pico-Surf™.
Figure 5:
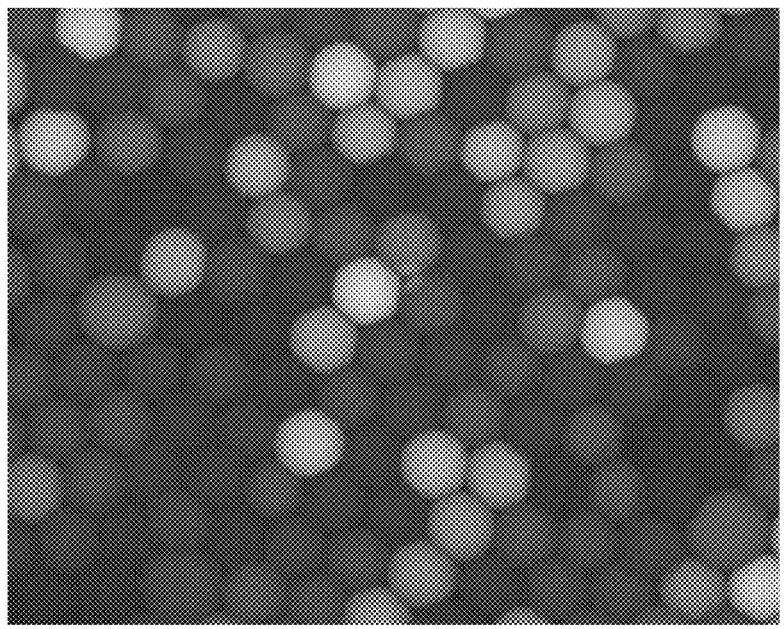
FIG. 5 shows a fluorescence microscopy image of an emulsion comprising a zwitterionic surfactant of the present invention in addition to the polyanionic additive PSS (0.5%)

Addition of the polyanionic additive PSS (0.5%) had little or no positive benefit with the non-ionic surfactant Pico-Surf™ (Sphere Fluidics Limited)—see the fluorescent image in FIG. 4. Again, the picodroplets are almost uniformly bright, indicating significant inter-droplet molecular exchange of resorufin. In contrast, with the addition of the polyanionic additive PSS (0.5%), the zwitterionic surfactant (4) still exhibited the presence of two populations of droplets—see FIG. 5.

Figure 6:
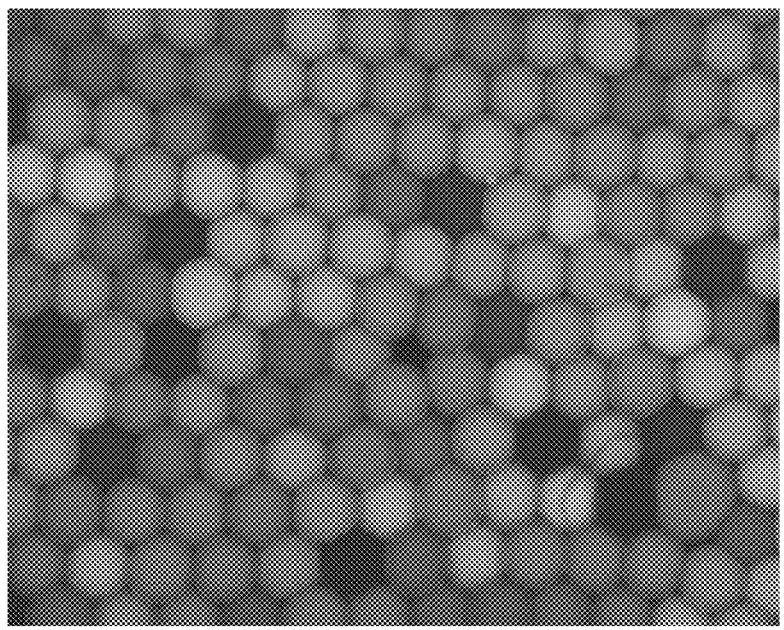
FIG. 6 shows a fluorescence microscopy image of a control emulsion comprising the non-ionic surfactant Pico-Surf™.
Figure 7:
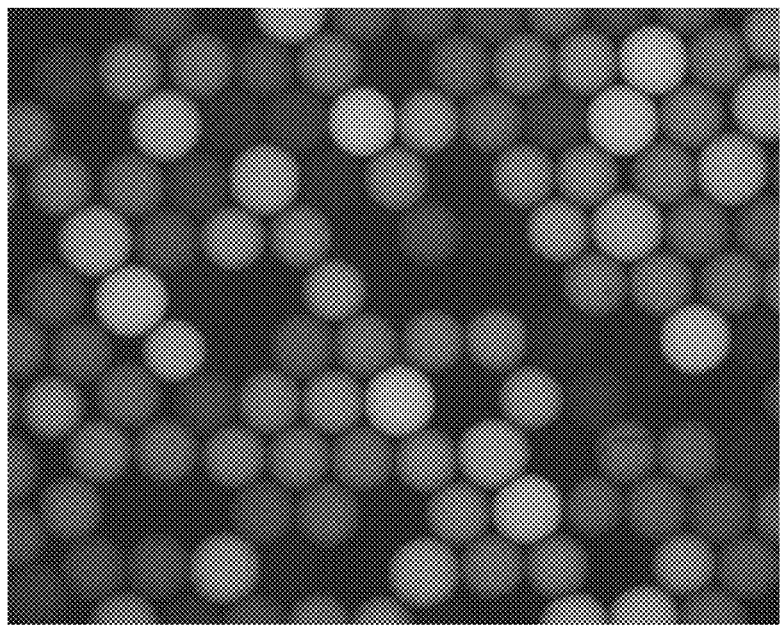
FIG. 7 shows a fluorescence microscopy image of an emulsion comprising a cationic surfactant of the present invention in addition to the polyanionic additive PSS (0.5%).

Cationic surfactant (9) was tested by the same methodology. Cationic surfactant (9) also showed the capability to stabilize the emulsion of PBS as the aqueous phase, and reduced inter-droplet molecular exchange of resorufin when compared with the control emulsion sample stabilized by Pico-Surf. This is clear by comparing the fluorescent images in FIG. 6 (comparative surfactant not containing polyanionic polymer additive PSS (0.5%) and FIG. 7 (cationic surfactant (9) containing polyanionic polymer additive PSS (0.5%)).

The invention claimed is:
1. A surfactant of formula (I):

(I)

wherein
A is a perfluoropolyether, wherein said perfluoropolyether comprises a repeat unit of the formula $-[CF(CF_3)CF_2O]_m-$, wherein m is an integer from 10 to 100;
$L_1$ is CONR', wherein R' is selected from H and $C_{1-6}$ alkyl;
a is 0 or 1;
b is 0 or an integer between 1 and 10;
$L_2$ is a linking group;
c is 0 or 1; and
X is selected from:
(a) any one of

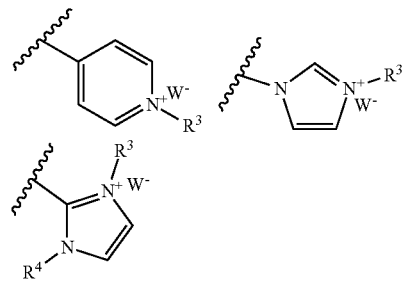

wherein $R^3$ is selected from $C_{1-6}$ alkyl, and $(CH_2)_dO(CH_2CH_2O)_eR^x$, wherein $R^x$ is H or $C_{1-6}$ alkyl, d is a positive integer from 2 to 6, and e is 0 or a positive integer from 1 to 100; $R^4$ is selected from $C_{1-6}$ alkyl; and $W^-$ is a counter ion; (b)-any one of

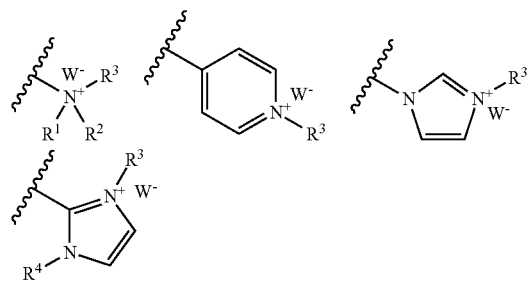

wherein $R^1$ and $R^2$ are independently selected from $C_{1-6}$ alky; $R^4$ is selected from $C_{1-6}$ alkyl; Z is $-(CH_2)_rO(CH_2CH_2O)_g(CH_2)_s-Y-(L_2)_c-(CH_2)_b-(L_1)_a-A$, wherein r is a positive integer from 2 to 6, g is 0 or a positive integer, s is 0 or a positive integer from 2 to 6, Y is

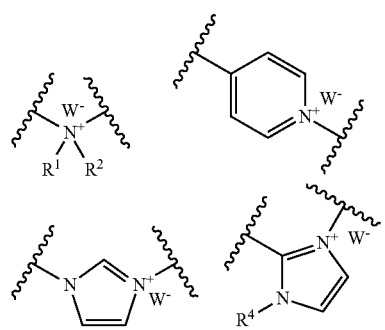

wherein $R^1$ and $R^2$ are independently selected from H and $C_{1-6}$ alkyl; $R^4$ is selected from $C_{1-6}$ alkyl; and $W^-$ is a counter ion.

2. A surfactant as claimed in claim 1, wherein m is an integer from 10 to 25.

3. A surfactant as claimed in claim 1, wherein a is 0.

4. A surfactant as claimed in claim 1, wherein a is 1 and $L_1$ is CONH or CONCH$_3$.

5. A surfactant as claimed in claim 1, wherein b is an integer from 1 to 10.

6. A surfactant as claimed in claim 1, wherein c is 0.

7. A surfactant as claimed claim 1, wherein said surfactant is selected from:

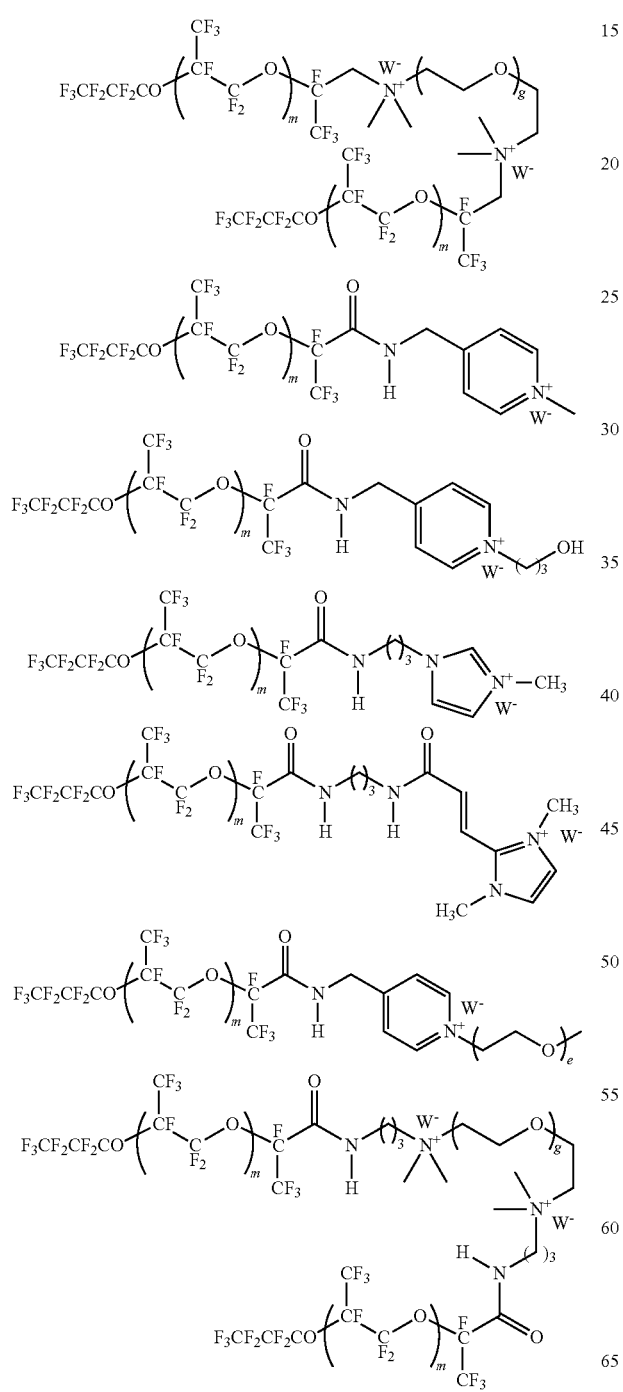

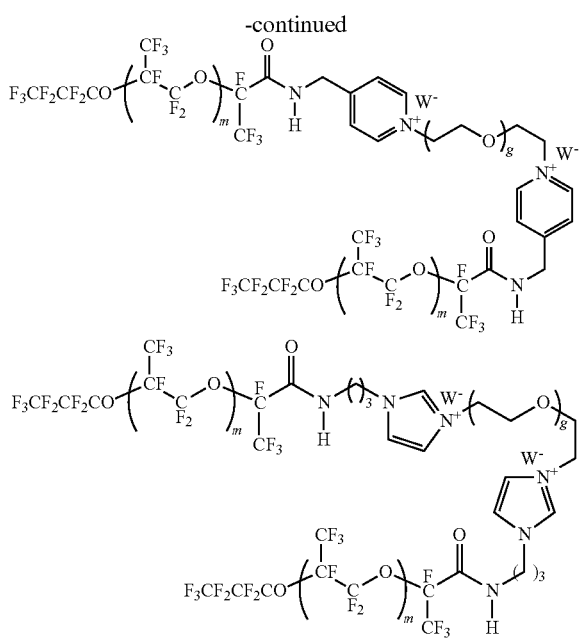

wherein
m is an integer from 10 to 100
e is 0 or a positive integer from 1 to 100; and
g is 0 or a positive integer from 1-100.

8. A method for making the surfactant of formula (I) of claim 1,
the method comprising:
reacting a compound of formula (a):

$$A\text{-}(L_1)_a\text{-}(CH_2)_b\text{-}(L_2)_c\text{-}X' \qquad (a)$$

wherein
A, $L_1$, a, $L_2$, and c are as defined with respect to formula (I);
b is 0 or an integer between 1 and 6; and
X' is selected from:

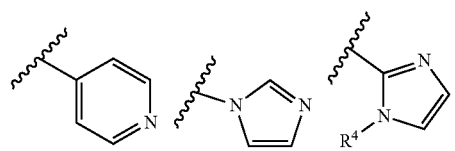

wherein
$R^4$ is as defined with respect to formula (I);
with $R^3$-W, wherein
$R^3$ is as defined with respect to formula (I); and
W is a leaving group.

9. A composition comprising the surfactant of formula (I) as claimed in claim 1, wherein said composition further comprises a multicharged compound or polymer, and wherein said multicharged compound or polymer is oppositely charged to said surfactant.

10. The composition as claimed in claim 9, wherein the composition is an emulsion comprising a discontinuous aqueous phase and a continuous oil phase.

11. A method of preparing an emulsion as claimed in claim 10 comprising:
(i) providing an aqueous phase;
(ii) providing an oil phase; and (iii) mixing said aqueous phase, said oil phase and the surfactant of formula (I)
wherein said mixing is by a flow focus junction, a T-junction or step emulsification nozzles of a microfluidic device.

12. A method comprising performing one or more chemical and/or biological reactions, and/or biological processes in the discontinuous aqueous phase of an emulsion as claimed in claim 10.

13. A method for sorting, coalescing, introducing a fluid into, or splitting droplets in a microfluidic device or extracting a molecule from a fluid, the method comprising any one of methods (A) to (F), wherein sorting method (A) comprises:
   (i) providing a stream of aqueous droplets in an emulsion as claimed in claim 10 in a channel of the microfluidic device;
   (ii) illuminating the stream from a first direction;
   (iii) detecting light from analytes within the droplets in a second direction; and
   (iv) sorting the droplets into one of a plurality of differentiated streams in response to the detected light or a measurable signal;
wherein coalescing method (B) comprises:
   (i) providing at least two aqueous droplets in an emulsion as claimed in claim 10 in a channel of the microfluidic device; and
   (ii) forcing said aqueous droplets to contact, thereby causing coalescence of the at least two aqueous droplets into a single droplet;
wherein method of introducing a fluid (C) comprises:
   (i) providing an aqueous droplet in an emulsion as claimed in claim 10 in a channel of the microfluidic device; and
   (ii) contacting the aqueous droplet with a stream of fluid, thereby introducing said fluid into the aqueous droplet;
wherein splitting method (D) comprises:
   (i) providing a microfluidic device comprising a microfluidic junction, said microfluidic junction comprising a first microfluidic channel, a second microfluidic channel and a third microfluidic channel;
   (ii) providing an aqueous droplet in an emulsion as claimed in claim 10 in said first microfluidic channel; and
   (iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel;
wherein sorting method (E) comprises:
   (i) providing a microfluidic device comprising a microfluidic junction, said microfluidic junction comprising a first microfluidic channel, a second microfluidic channel and a third microfluidic channel;
   (ii) providing an aqueous droplet in an emulsion as claimed in claim 10 in said first microfluidic channel;
   (iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel;
   (iv) detecting said first daughter droplet by mass spectroscopy; and
   (v) sorting said second daughter droplets into one of a plurality of differentiated streams responsive to the mass spectroscopy
wherein extracting method (F) comprises:
   (i) dissolving a surfactant of formula (I):

wherein
A is a perfluoropolyether, wherein said perfluoropolyether comprises a repeat unit of the formula —[CF(CF$_3$)CF$_2$O]$_m$—, wherein m is an integer from 10 to 100;
L$_1$ is CONR', wherein R' is selected from H and C$_{1-6}$ alkyl;
a is 0 or 1;
b is 0 or an integer between 1 and 10;
L$_2$ is a linking group;
c is 0 or 1; and
X is selected from:
a) any one of

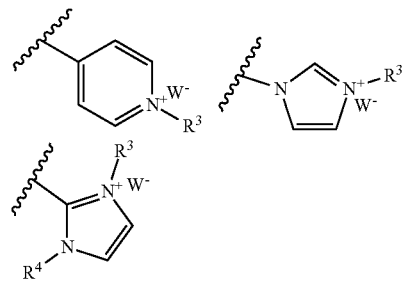

wherein R$^3$ is selected from C$_{1-6}$ alkyl, and (CH$_2$)$_d$O(CH$_2$CH$_2$O)$_e$R$^x$, wherein R$^x$ is H or C$_{1-6}$ alkyl, d is a positive integer from 2 to 6, and e is 0 or a positive integer from 1 to 100; R$^4$ is selected from C$_{1-6}$ alkyl; and W$^-$ is a counter ion;
(b) any one of

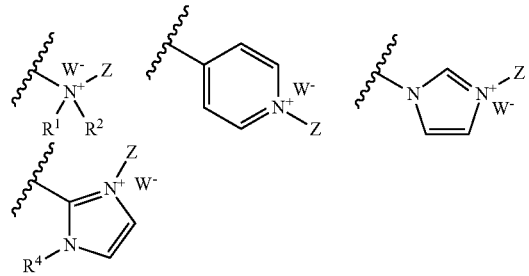

wherein R$^1$ and R$^2$ are independently selected from C$_{1-6}$ alky; R$^4$ is selected from C$_{1-6}$ alkyl; Z is —(CH$_2$)$_r$O(CH$_2$CH$_2$O)$_g$(CH$_2$)$_s$—Y-(L$_2$)$_c$-(CH$_2$)$_b$-(L$_1$)$_a$-A, wherein r is a positive integer from 2 to 6, g is 0 or a positive integer, s is 0 or a positive integer from 2 to 6, Y is

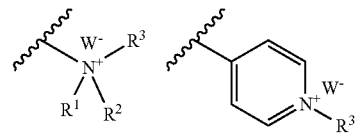

-continued

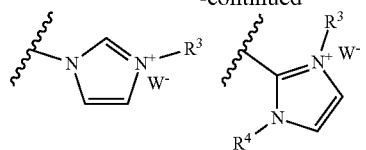

wherein $R^1$ and $R^2$ are independently selected from H and $C_{1-6}$ alkyl; $R^4$ is selected from $C_{1-6}$ alkyl; and $W^-$ is a counter ion, in carbon dioxide to form a carbon dioxide/surfactant mixture; and (ii) adding a fluid comprising the molecule to the carbon dioxide/surfactant mixture, thereby extracting the molecule from the fluid into the carbon dioxide.

* * * * *